(12) United States Patent (10) Patent No.: US 8,140,397 B2
Robinson et al. (45) Date of Patent: Mar. 20, 2012

(54) SYSTEM AND METHOD FOR MONITORING PRODUCTION OF AGRICULTURAL PRODUCTS

(76) Inventors: Steve Robinson, Monterey, CA (US); Jeffrey Polly, Monterey, CA (US)

( * ) Notice: Subject to any disclaimer, the term of this patent is extended or adjusted under 35 U.S.C. 154(b) by 0 days.

(21) Appl. No.: 12/109,315

(22) Filed: Apr. 24, 2008

(65) Prior Publication Data

US 2009/0082964 A1 Mar. 26, 2009

Related U.S. Application Data

(60) Provisional application No. 60/926,087, filed on Apr. 24, 2007.

(51) Int. Cl.
*G06Q 10/00* (2006.01)
(52) U.S. Cl. ........................................................ 705/25
(58) Field of Classification Search ................. 705/1, 28
See application file for complete search history.

(56) References Cited

U.S. PATENT DOCUMENTS

| 6,963,881 B2 | 11/2005 | Pickett et al. |
| 2003/0236719 A1 | 12/2003 | Meagher et al. |
| 2006/0169776 A1 | 8/2006 | Hornbaker et al. |
| 2006/0271555 A1 | 11/2006 | Beck et al. |

OTHER PUBLICATIONS

"Genetically Modified Foods and Spatial Technology in Europe" Europemedia, Jul. 4, 2003.*
International Search Report and Written Opinion mailed on Sep. 4, 2008, for PCT Application No. PCT/US08/61476 filed on Apr. 24, 2008, 7 pages.

* cited by examiner

*Primary Examiner* — Matthew Gart
*Assistant Examiner* — Seye Iwarere
(74) *Attorney, Agent, or Firm* — Morrison & Foerster LLP

(57) ABSTRACT

In harvesting an agricultural product from a field to allow for later identification of a specific section of field where the harvesting occurred, harvest source information is inputted. A first Global Positioning System (GPS) coordinate corresponding to a first location in the specific section of field is captured. The agricultural product is harvested from the first location to a second location in the specific section of field. The harvested agricultural product is stored in a set of containers. A second GPS coordinate corresponding to the second location is captured. A unique Radio Frequency Identification (RFID) value is associated to each container of the set of containers to create a set of RFID values. The source information, the first GSP coordinate, and the second GPS coordinate are associated to the set of RFID values.

19 Claims, 36 Drawing Sheets

RFID Components
Antenna:
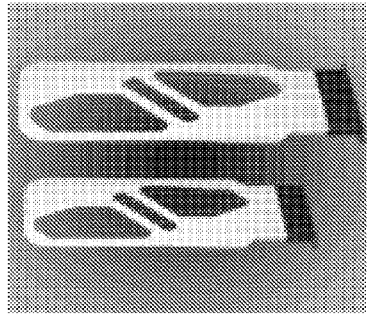
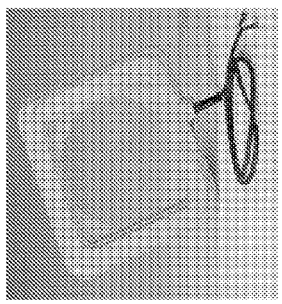
Readers:
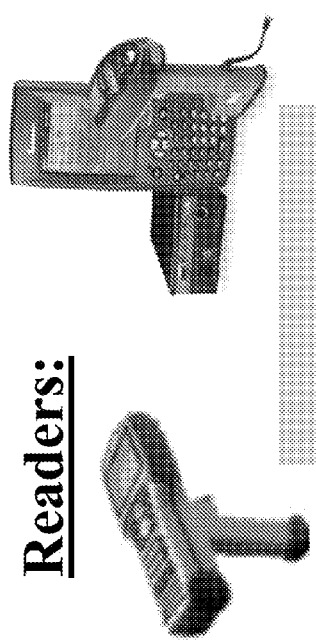
RFID Tags:
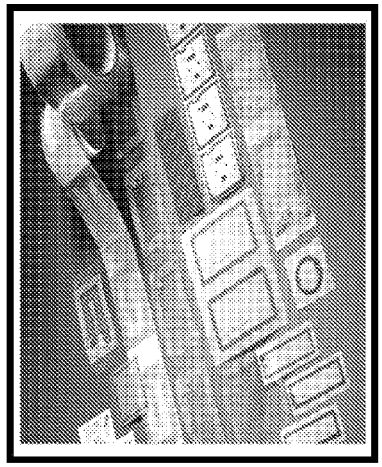
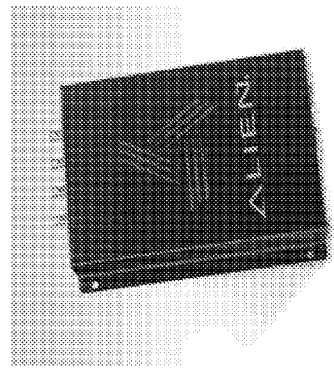
FIGURE 6

RFID Advantages

Traditional Bar Code Scanning

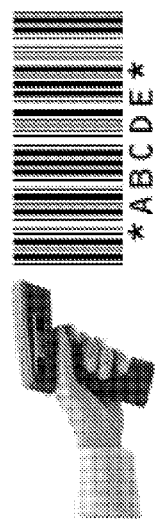

- Must have line of sight
- Scan one at a time
- Requires Operator intervention
- Sensitive to light conditions
- Read-only
- Static

RFID Scanning

- General vicinity reading
- Not sensitive to ambient conditions
- Reads multiple tags simultaneously
- Automates read process
- Reduces human error
- GPS capability
- Flexibility to write data to tag

FIGURE 8

RFID Overview

- Scope: Utilize RFID technology to track movements of raw materials from the field to the packaging machine

- Project Vision:
  - Link critical data to RFID tags placed on raw material containers in the field
  - Automatically track movements of materials through processing steps
  - Support system
    - Information "dashboard" to provide management tools
    - Automated "alert" system to stop process violation
    - Automatically link raw material movements to finished product

FIGURE 9

RFID and Food Safety Link

- ◆ RFID adds value to the food safety process by connecting a location in the field to a consumer

- Package bag code provides manufacturing specifics
  - RFID system provides definitive raw material history
  - RFID data feeds enhanced informational systems
  - GPS provides traceability to a specific location in the field

SYSTEM AND METHOD FOR MONITORING PRODUCTION OF AGRICULTURAL PRODUCTS

CROSS REFERENCE TO RELATED APPLICATION

The present application claims the benefit of U.S. Provisional Application Ser. No. 60/926,087, filed Apr. 24, 2007, which is hereby incorporated by reference in its entirety for all purposes.

BACKGROUND

1. Field

The present application relates to the production of agricultural products. More specifically, the present application relates to harvesting an agricultural product from a field that allows for later identification of a specific section of the field where the harvesting occurred.

2. Related Art

Modern agricultural production involves the growing of crops in many different locations for subsequent distribution throughout the United States and the world. Because of the complexity of the production and distribution channels and the difficulty in labeling agricultural products, it has been difficult to track the exact movement of a particular crop harvest through the agricultural production system.

Recent incidents of food-borne illnesses caused by contaminated produce have highlighted the need for an effective system to track the production and distribution of agricultural products. In recent outbreaks of produce-carried food-borne illnesses, it was not possible to determine exactly where the contaminated crop was produced. This lack of ability to pinpoint the exact location of the production of contaminated produce has created difficulties in improving the safety of agricultural products.

In addition to food safety issues, producers of agricultural products would benefit from improvements in systems to monitor the production of agricultural goods, in order to increase the overall quality of agricultural goods. By increasing the amount of information available to producers regarding crop production, crop producers can more effectively improve agricultural production methods.

SUMMARY

In one embodiment, in harvesting an agricultural product from a field to allow for later identification of a specific section of field where the harvesting occurred, harvest source information is inputted. A first Global Positioning System (GPS) coordinate corresponding to a first location in the specific section of field is captured. The agricultural product is harvested from the first location to a second location in the specific section of field. The harvested agricultural product is stored in a set of containers. A second GPS coordinate corresponding to the second location is captured. A unique Radio Frequency Identification (RFID) value is associated to each container of the set of containers to create a set of RFID values. The source information, the first GSP coordinate, and the second GPS coordinate are associated to the set of RFID values.

BRIEF DESCRIPTION OF DRAWING FIGURES

The present application can be best understood by reference to the following description taken in conjunction with the accompanying drawing FIGURES, in which like parts may be referred to by like numerals.

FIG. 6 illustrates various readers, antenna, and RFID tags.

FIG. 8 provides an illustration of one embodiment of a Harvest System.

FIG. 9 provides an illustration of one embodiment of a Intermec 761 terminal.

Figure 10:
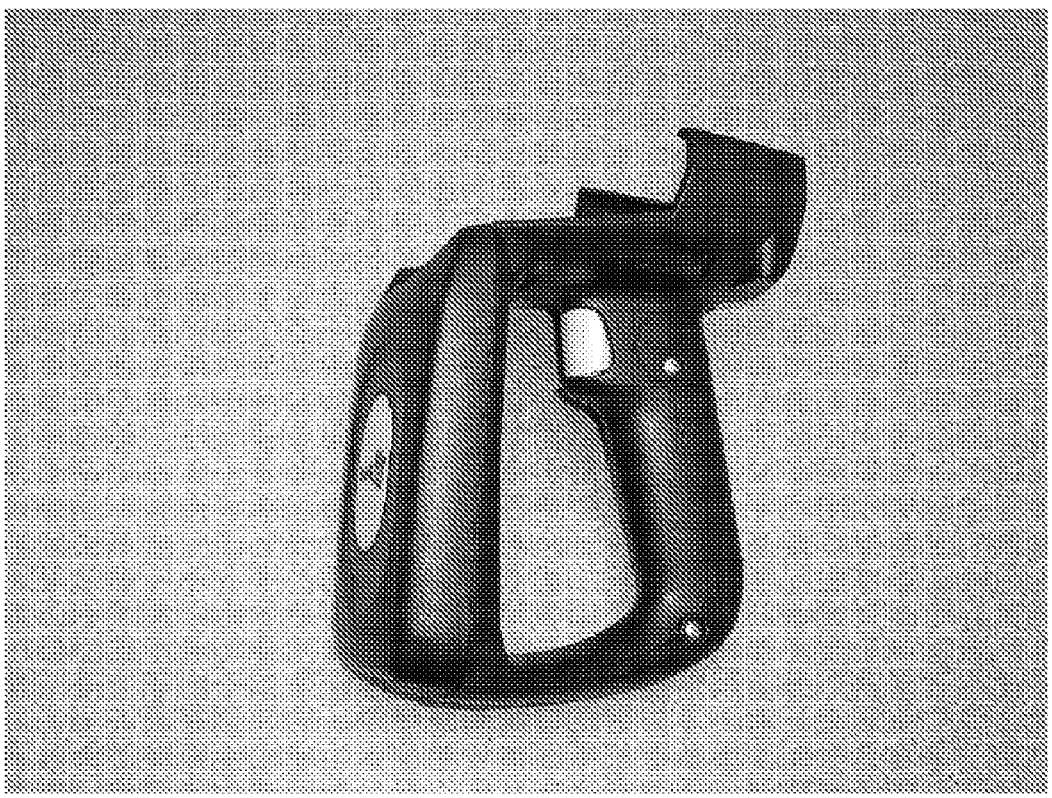

FIG. 10 provides an illustration of one embodiment of a Intermec IP4 RFID reader.

FIG. 11 provides an illustration of one embodiment of a Linkspoint GPS module.

Figure 12:

FIG. 12 illustrates a container being scanned using the Harvest System.

Figure 13:
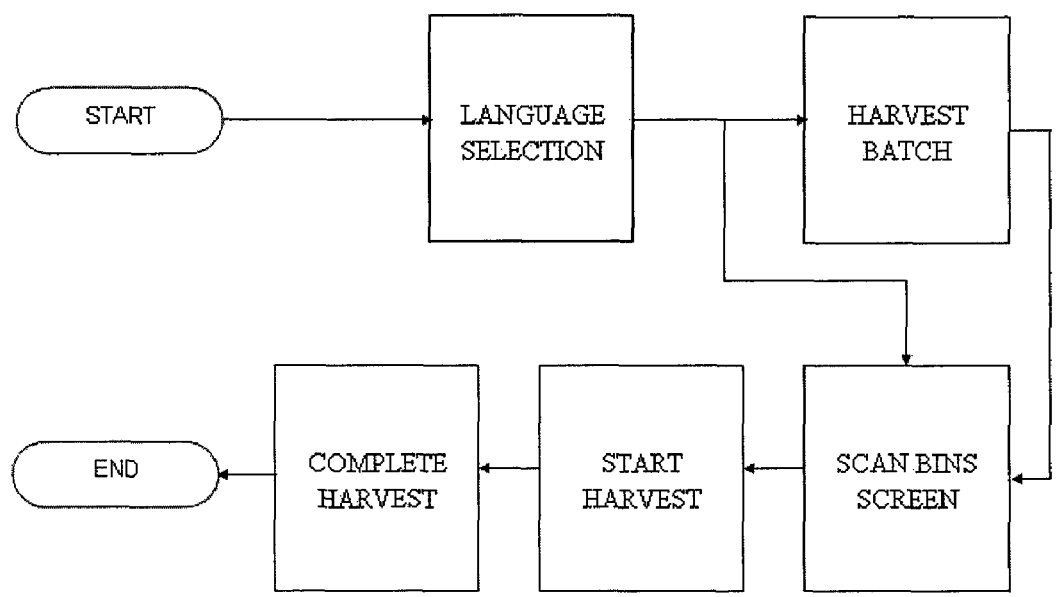

FIG. 13 shows an exemplary process flow diagram of the operations of a harvest application software.

FIGS. 14-36 show various exemplary screens and screen functionalities of the harvest application software.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

As discussed above, the commercial production of an agricultural product involves complex production and distribution channels. For various reasons, including incidents of food-borne illnesses caused by contaminated produce, it is desirable to be able to trace an agricultural product to a specific location from which it was harvested. Thus, with reference to FIG. 1, an exemplary process 100 is depicted of harvesting an agricultural product from a field that allows for later identification of a specific section of the field where the harvesting occurred.

In step 102, harvest source information is inputted. Harvest source information can include any one or more of grower ranch lot (GRL), product type, harvesting entity, grower, bill of lading (BOL), and the harvest crew. In step 104, a first Global Positioning System (GPS) coordinate corresponding to a first location in the specific section of the field is captured. In step 106, the agricultural product is harvested from the first location to a second location in the specific section of field. In step 108, the harvested agricultural product is stored in a set of containers. In step 110, a second GPS coordinate corresponding to the second location is captured. In step 112, a unique Radio Frequency Identification (RFID) value is associated with each container of the set of containers to create a set of RFID values. In step 114, the source information, the first GPS coordinate, and the second GPS coordinate are associated with the set of RFID values.

Because the set of RFID values are also associated with the set of containers, which contain the agricultural product harvested from the specific section of the field, it is possible to later determine the specific section of the field from where the agricultural product in a particular container was harvested based on the association between the set of RFID values and the GPS coordinates (the first and second GPS coordinates). For example, to determine the specific section of the field from where the agricultural product was harvested, the RFID value of the container in which the agricultural product was stored can be used to determine the GPS coordinates associated with the RFID value of the container. The GPS coordinates correspond to the first and second locations in the specific section of the field from where the agricultural product was harvested. Additionally, the harvest source information associated with the RFID value can provide additional information, such as the grower and the harvest crew.

Figure 1:
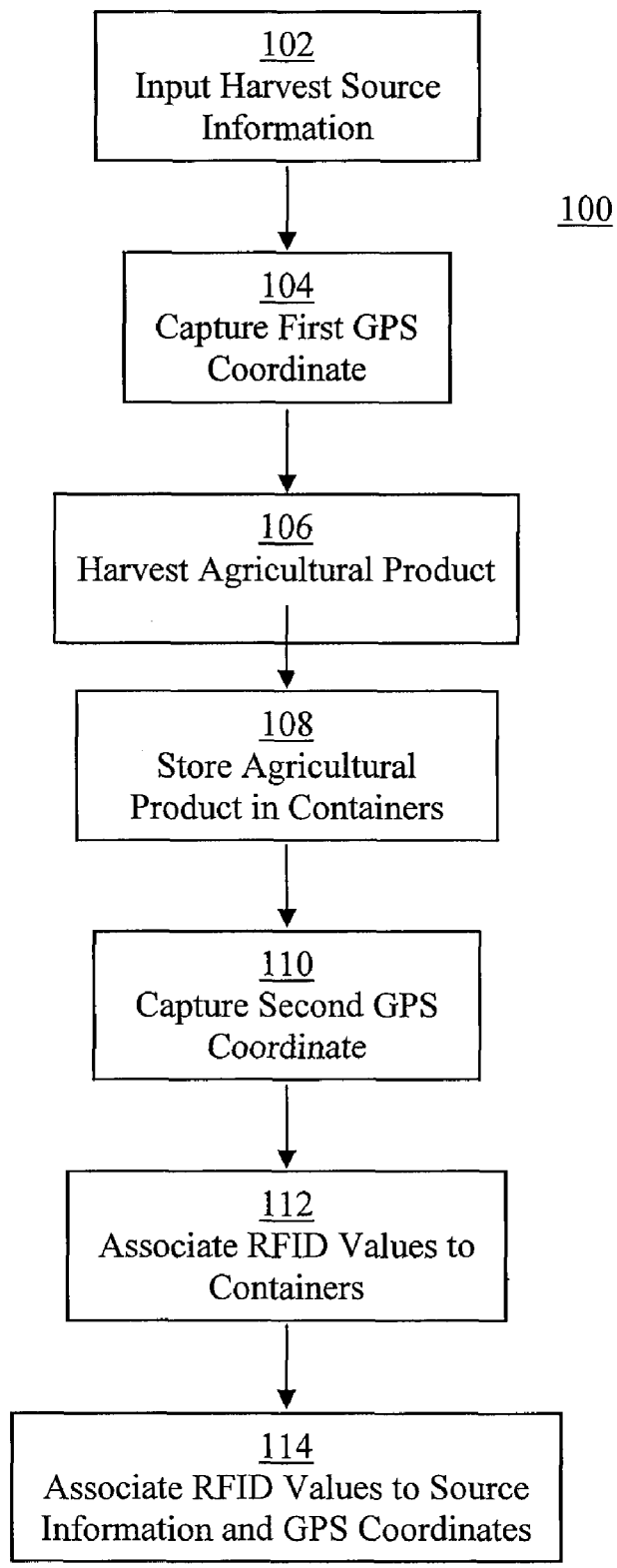
FIG. 1 is a flow diagram of an exemplary process of harvesting an agricultural product from a field that allows for later identification of a specific section of the field where the harvesting occurred.

Although FIG. 1 depicts process 100 being performed in a particular sequence, it should be recognized that the sequence in which steps 102-114 are performed can be varied. For example, step 112 can be performed prior to step 104.

Figure 2:
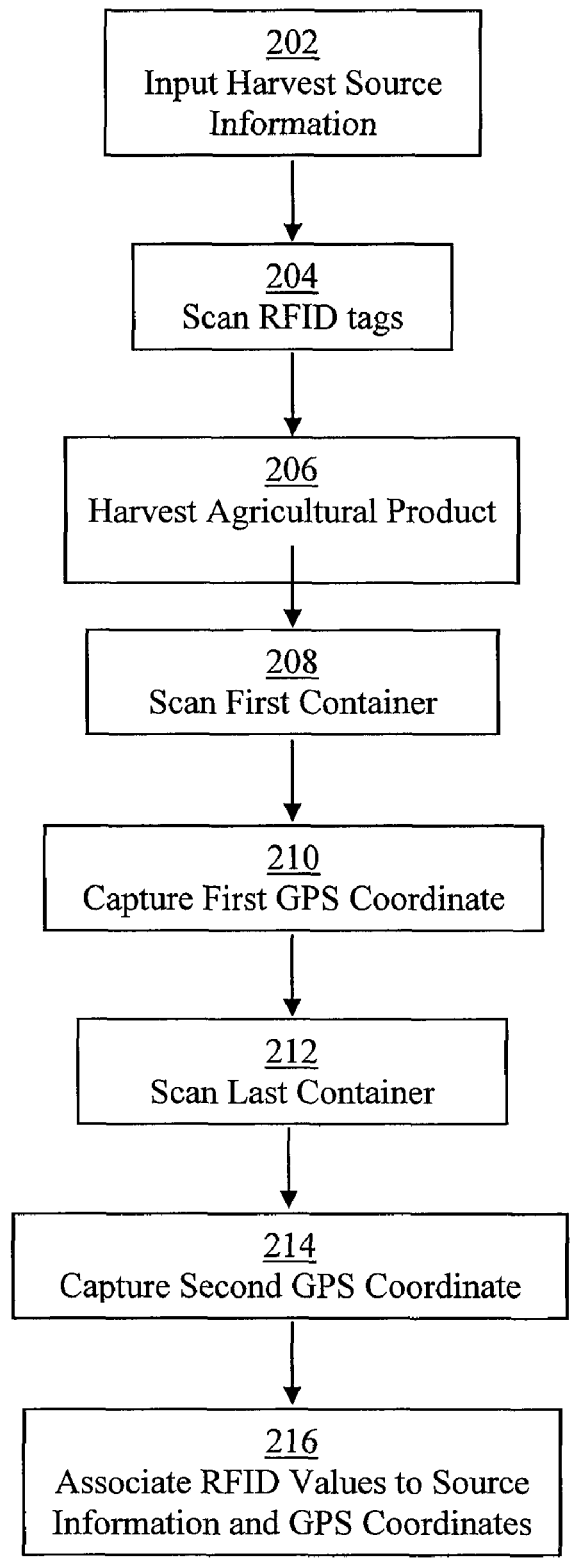
FIG. 2 is a flow diagram of an exemplary process of harvesting an agricultural product from a field that allows for later identification of a specific section of the field where the harvesting occurred.

In particular, FIG. 2 depicts an exemplary process 200 of harvesting an agricultural product from a field that allows for later identification of a specific section of the field where the harvesting occurred. In step 202, harvest source information is inputted. In step 204, a set of RFID tags is scanned. In step 206, the agricultural product is harvested from a first location to a second location in the specific section of the field. The agricultural product is stored in the set of containers as the agricultural product is harvested from the specific section of the field. In step 208, the first container of the set of containers is scanned when the first container is filled with the agricultural product. In step 210, a first GPS coordinate corresponding to the first location, which corresponds to where the first container was scanned in step 208, in the specific section of the field is captured. In step 212, the last container of the set of containers is scanned when the last container is filled with the agricultural product. In step 214, a second GPS coordinate corresponding to the second location, which corresponds to where the last container was scanned in step 212, in the specific section of the field is captured. In step 216, the source information, the first GPS coordinate, and the second GPS coordinate are associated with the set of RFID values.

With reference again to FIG. 1, it should be recognized that the steps of process 100 can be performed in multiple locations. For example, some steps can be performed in the field, while other steps can be performed away from the field.

Figure 3:
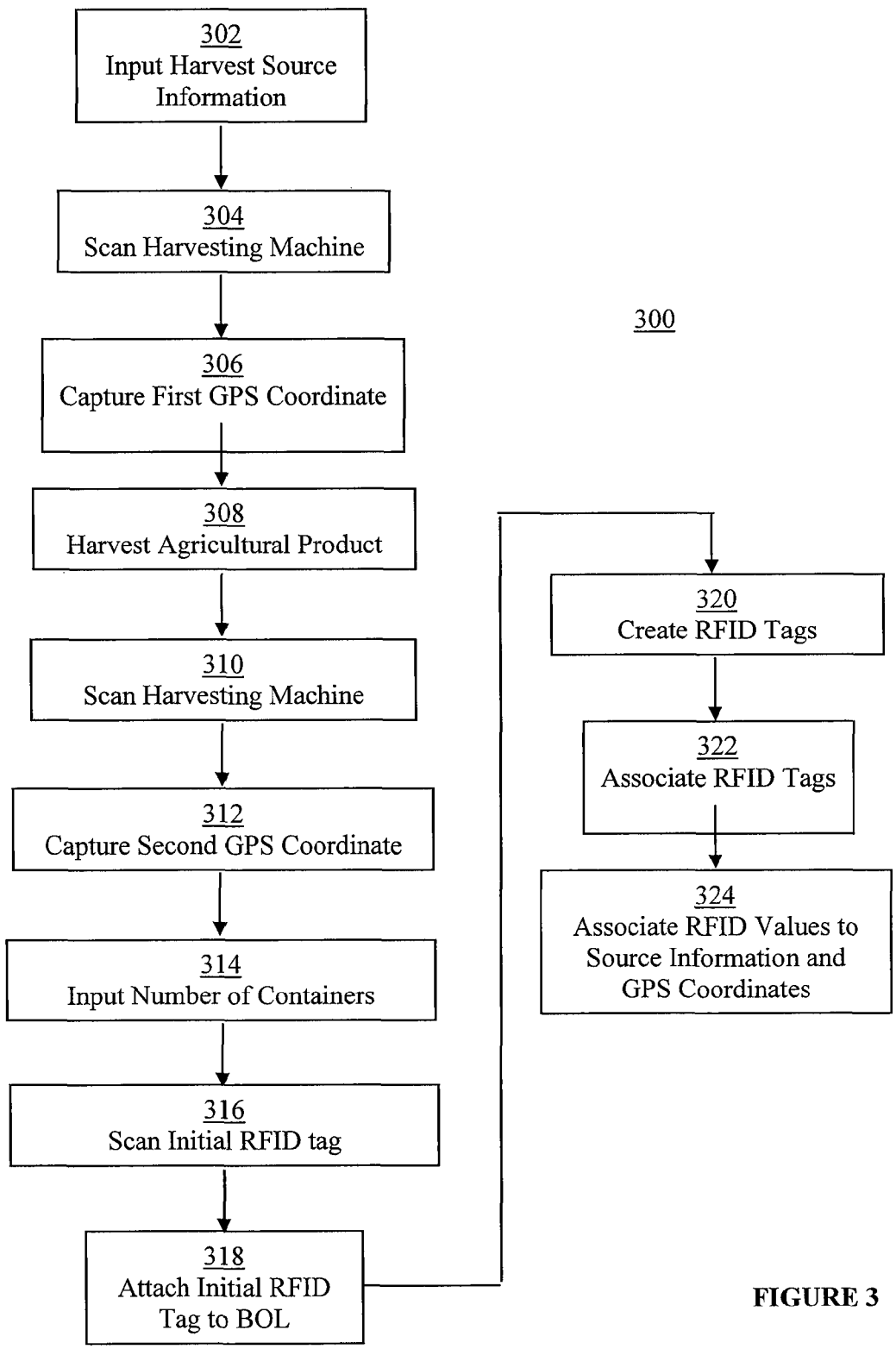
FIG. 3 is a flow diagram of an exemplary process of harvesting an agricultural product from a field that allows for later identification of a specific section of the field where the harvesting occurred.

In particular, FIG. 3 depicts an exemplary process 300 of harvesting an agricultural product from a field that allows for later identification of a specific section of the field where the harvesting occurred. In step 302, harvest source information is inputted. In step 304, the harvest operation is initiated by an initial scan of the harvesting machine. In step 306, a first GPS coordinate corresponding to the first location, which corresponds to where the harvesting machine was scanned in step 304, in the specific section of the field is captured. In step 308, the agricultural product is harvested from the first location to a second location in the specific section of the field using the harvesting machine. The agricultural product is stored in a set of containers as the agricultural product is harvested from the specific section of the field. In step 310, the harvest operation ends by an end scan of the harvesting machine. In step 312, a second GPS coordinate corresponding to the second location, which corresponds to where the harvesting machine was scanned in step 310, in the specific section of the field is captured. In step 314, the number of containers in the set of containers used to stored the harvested agricultural product is inputted. In step 316, an initial RFID tag is scanned and associated with the harvest operation source information and GPS coordinates (first and second coordinates). In step 318, the initial RFID tag is attached to the BOL. In step 320, RFID tags equal to the number of containers harvested are created by scanning the appropriate number of RFID tags and associating the tags with the harvest operation source information, including BOL, time, and GPS coordinates. In step 322, the associated RFID tags are attached to the containers. In step 324, the source information, the first GPS coordinate, and the second GPS coordinate are associated with the set of RFID values.

In process 300, steps 302 to 318 are performed in the field, while steps 320 and 324 are performed upon arrival at a warehouse. Separating the steps as described may alleviate user error and reduce the number of operations to be carried out by the field harvest crew.

Figure 4:
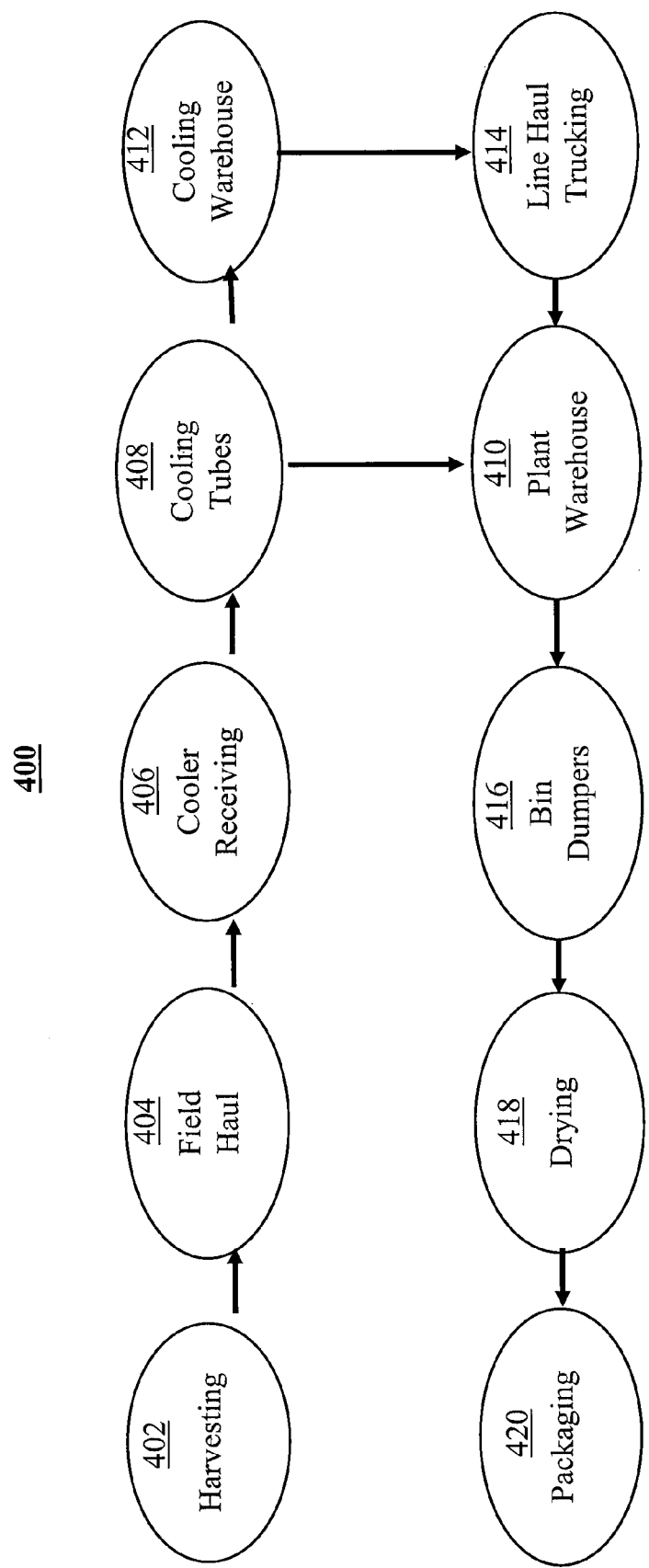
FIG. 4 is a flow diagram of the movement of the agricultural product from field to packaging.

FIG. 4 depicts an exemplary process 400 for tracking the movement of the agricultural product from the field to packaging. In step 402, the agricultural product is harvested. In step 404, the agricultural product is transported from the field, such as on a transport truck, in the containers. In step 406, the agricultural product is received at a cooler. In step 408, the agricultural product is cooled within cooling tubes. In step 410, the agricultural product is processed in a plant warehouse. As depicted in FIG. 4, prior to processing the agricultural product in the plant warehouse, in step 412, the agricultural product can be stored in a cooling warehouse. In step 414, the agricultural product is transported from the cooling warehouse to the plant warehouse. In step 416, the agricultural product is removed from the containers using bin dumpers. In step 418, the agricultural product is dried. In step 420, the agricultural product is packaged into a set of packages, such as into bags.

Each package, such as a bag, is associated with a unique identification, such as a bar code, to create a set of unique identifications. The unique identifications, which are associated with the packages, are associated with the set of RFID values, which are associated with the containers. Thus, the agricultural product packaged in any one package, such as a bag, in the set of packages is traceable to the specific location in the field from which the agricultural product was harvested using the association between the unique identifications to the set of RFID values.

Figure 5:
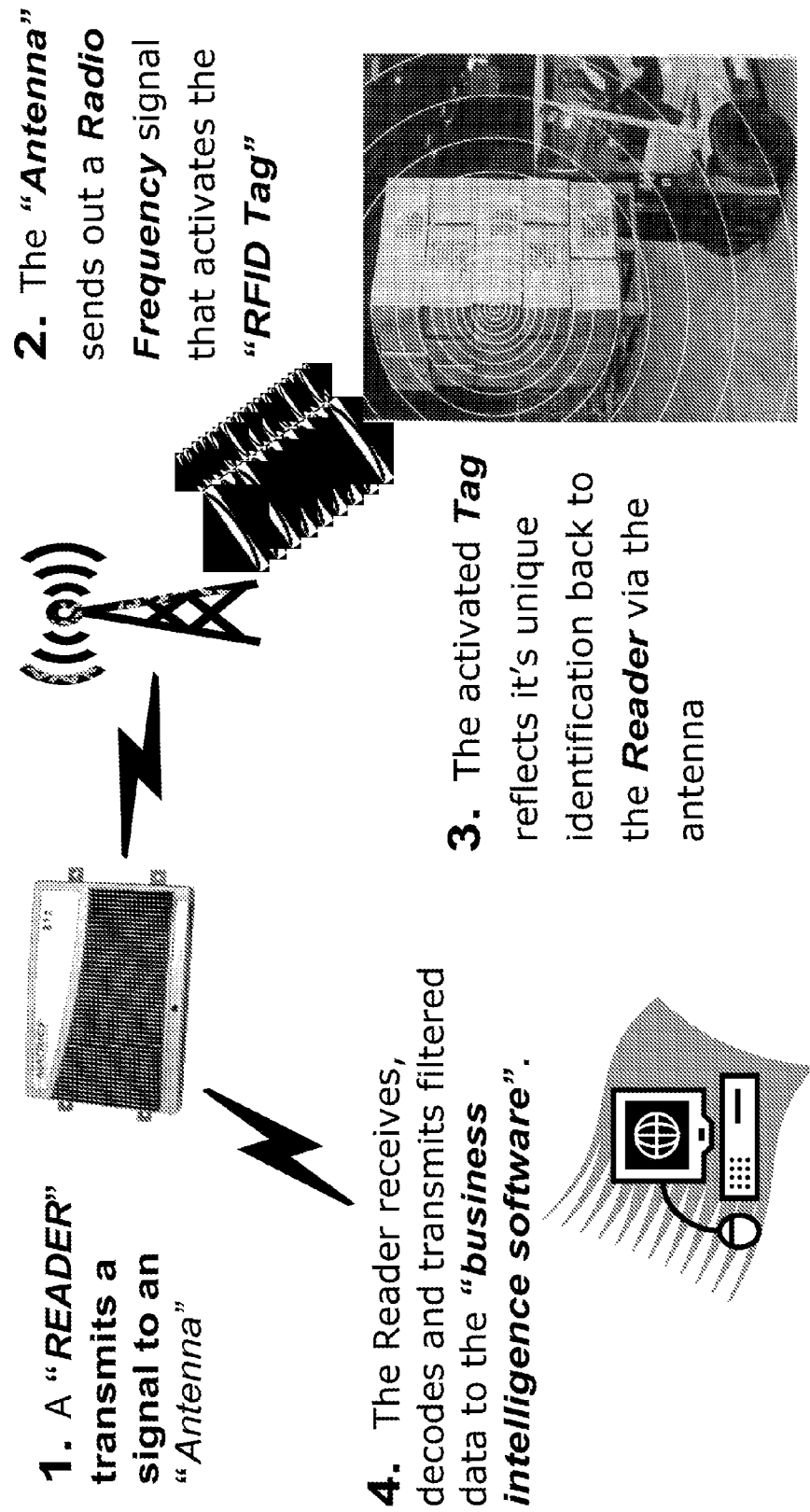
FIG. 5 illustrates an RFID scanning system.

The movement of the harvested agricultural product through process 400 can be tracked using an RFID scanning system. For example, FIG. 5 depicts an exemplary RF scanning system that includes a reader, an antenna, and RFID tags. As depicted in FIG. 5, the reader transmits a signal to an antenna. The antenna sends out an RF signal that activates the RFID tag. The activated RFID tag reflects its unique identification back to the reader via the antenna. The reader receives, decodes and transmits filtered data, including identification read from the activated RFID tag, to a processor, such as a business intelligence software running on a computer.

Figure 7:
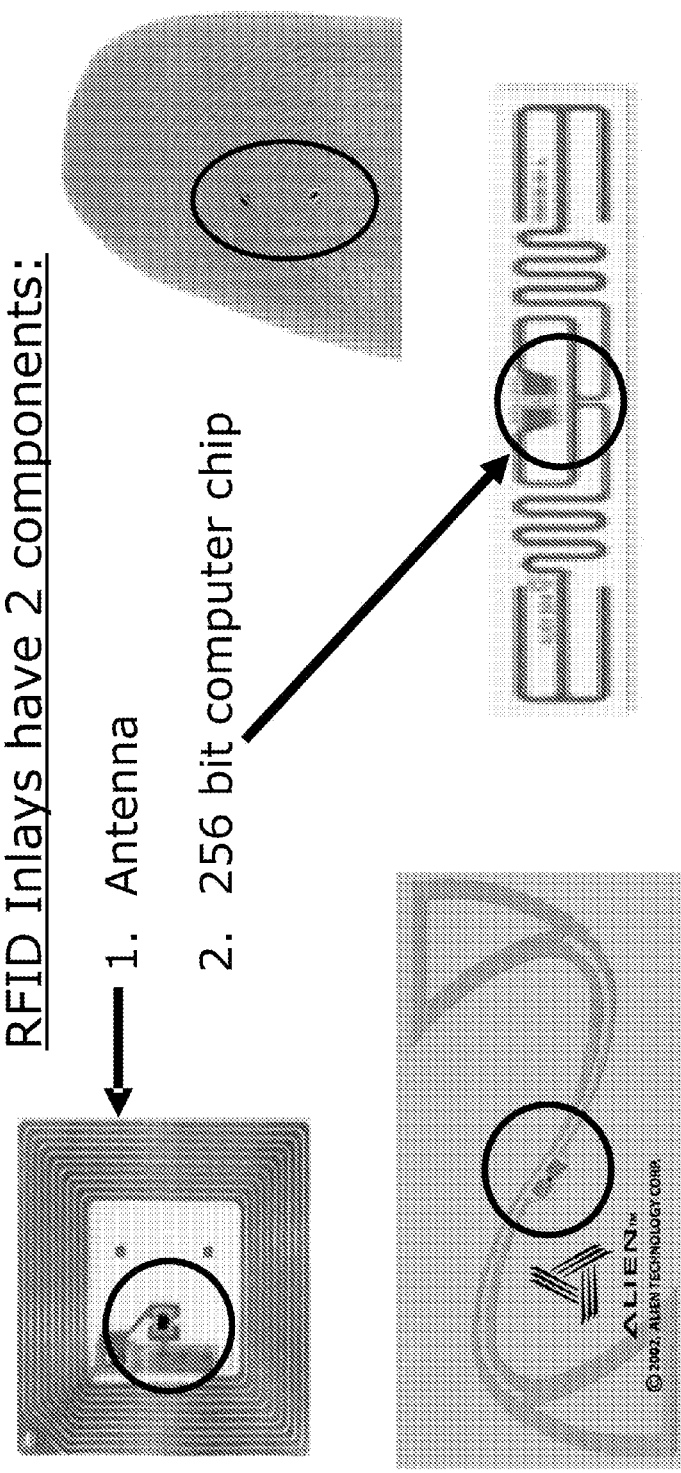
FIG. 7 illustrates various RFID inlays.

FIG. 6 depicts different types of readers, antennas, and RFID tags. FIG. 7 depicts components of typical RFID chips that can be using in the RFID scanning system described above. In particular, RFID chips include an antenna and a computer chip.

With reference again to FIG. 4, RFID tags can be read using an RFID scanning system during any number of steps in process 400 to track the movement of the harvesting agricultural product. For example, RFID tags can be read in steps 402, 406, 408, 410, 414, 416, and 418 using the RFID scanning system.

With reference again to FIG. 1, in one exemplary embodiment, a mobile handheld device, which is hereafter referred to as a Harvest System, can be used to perform various steps of process 100. The Harvest System can include a hand held data collection terminal equipped with GPS, RFID scanning capability, and manual information input capabilities.

FIG. 8 depicts one embodiment of the Harvest System. The Harvest System depicted in FIG. 8 includes a hand held data collection terminal, a RFID reader, and GPS module. The collection terminal, RFID reader, and GPS module may be composed of separable parts that can be joined together to create the Harvest System. FIG. 12 depicts a container being scanned using the Harvest System.

FIG. 9 provides an illustration of one embodiment of the data collection terminal of the Harvest System. The terminal may be commercially available, and it may be equipped with an internal cellular data communication adaptor. The terminal may have an infrared (IR) port to communicate with the RFID reader and it may operate on rechargeable batteries.

FIG. 10 provides an illustration of one embodiment of the RFID reader of the Harvest System. The RFID reader may have an IR port to communicate with the data collection terminal, and it may operate on rechargeable batteries.

In the specific embodiment of the Harvest System depicted in FIGS. 8 and 9, the hand held data collection terminal is a commercially available product from Intermec Technologies. In particular, the terminal is the Intermec 761 terminal running the Windows Mobile 2003 Operating System equipped with an internal Verizon cellular data communication adaptor. The terminal is attached to Intermec's IP4 RFID reader. The terminal integrates with the reader via the infrared (IR) port on both the terminal and reader. Both the terminal and reader operate on separate rechargeable batteries. The Intermec 761 and IP4 reader were selected because they presented the only commercially available solution that provided RFID tag read capability and the ability to transmit that data over a cellular connection.

FIG. 11 provides an illustration of one embodiment of the GPS module of the Harvest System. In particular, FIG. 11 depicts the Intermec 761 integrated with a Linkspoint, GlobalPoint GPS module. The GPS module provides the ability to capture GPS coordinates. As described above, the GPS module provides DFV the ability to capture the specific location in a field where a set of containers or BOL was harvested. The ability to capture, identify and store the data identifying the specific section of a field where a harvest occurred is a unique capability not known to exist within the produce industry.

The Harvest System includes a software system, which is referred to hereafter as the harvest application software. The harvest application software formats and links all data captured. Specifically, the harvest application software performs, in part, the following operations:

Manage data manually entered through the data entry terminal;
Manage data automatically captured from the RFID reader;
Link GPS coordinates received via the GPS system integrated into the hand held terminal;
Configure all data into a logical format; and
Format data for transmission via cell phone technology that is integrated into the hand held terminal.

The harvest application software was developed on the Microsoft.Net platform utilizing Visual Studio and was written bilingual; English or Spanish, which is selectable by the user. It should be recognized, however, that various software programs and platforms may be used.

EXAMPLE

Process Flow Diagram

FIG. 13 illustrates an exemplary process flow diagram for the operations performed by the harvest application software. As will be described in more detail below, the operations performed by the harvest application software include operations related to a language selection screen, a harvest batch screen, a scan bins screen, a start harvest screen, and a complete harvest screen.

EXAMPLE

Language Selection Screen

Figure 14:
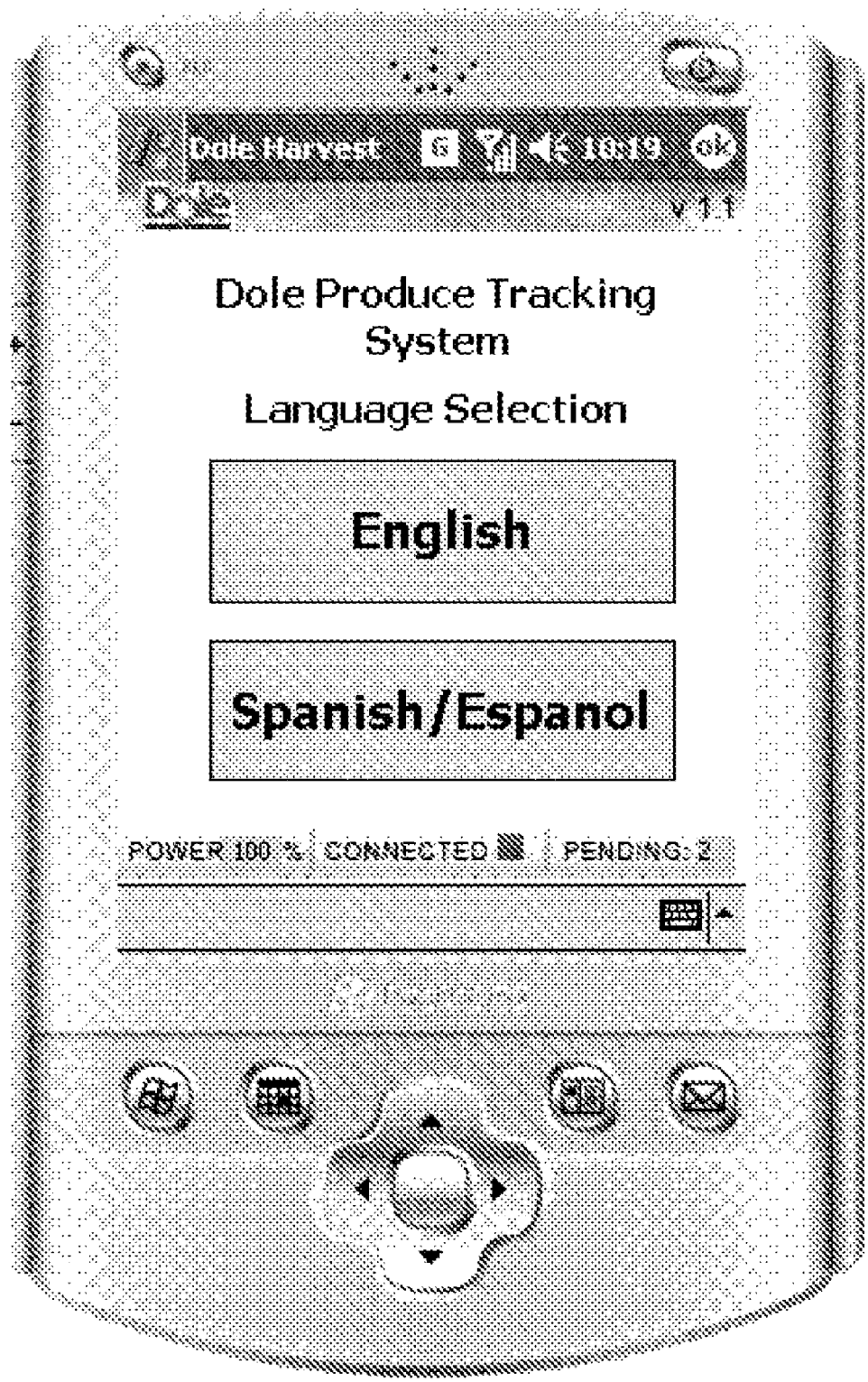

FIG. 14 illustrates an exemplary language selection screen. The language selection screen is used to select between the languages English and Spanish supported by the application. Clicking on area 1400 displays the application in the English version.

EXAMPLE

Initial Selection Screen

Figure 15:

FIG. 15 illustrates an exemplary initial selection screen. The initial selection screen is used for the following purposes: a) setting the Harvest Batch Information; b) navigating to the screen where the user can start scanning the containers; and c) updating the latest Product and GRL information Initial Selection Screen. Clicking on area 1500 navigates to a "Harvest Batch Information" screen. Clicking on area 1502 navigates to a "Scan Bins" screen.

Figure 16:
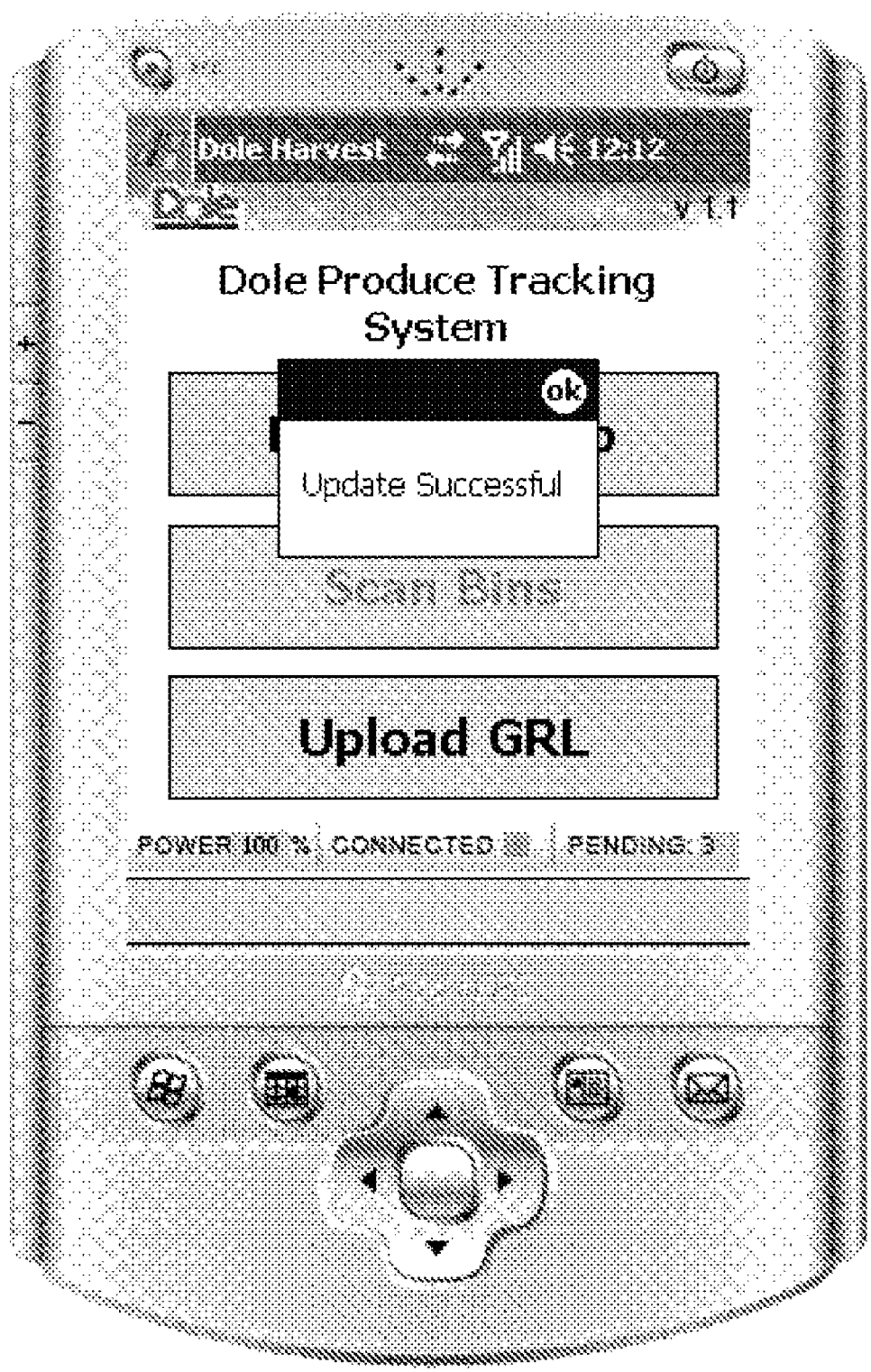

Clicking on area 1504 fetches and updates the latest product and GRL information. If the update is successful screen 1600 of FIG. 16 is displayed. Also on successful update, area 1602 of screen 1600 is disabled forcing the user to set the Harvest Batch info for the new Products and GRL.

Figure 17:

If the update fails, a popup message 1700 displaying the failure appears as shown in FIG. 17. In one embodiment, the Update operation might take few seconds to a minute based on the connectivity to the server. Also this operation can be performed only when the device is connected to the network as indicated by a green icon (not shown) adjacent to the connected label 1702 in the footer.

EXAMPLE

Harvest Batch Screen Functionality

Figure 18:

FIG. 18 depicts the Harvest Batch Screen used to set up information such as BOL, product, GRL, grower and harvester associated with the current batch of harvest. The data entered in this screen is mapped to the containers, such as plastic/fiber bins, filled with agricultural product, which enables tracking the containers tagged with RFID as a batch. The user can either navigate back to the "Language Selection" screen of FIG. 14 (also address as "Home" throughout the document) or advance to Scan Bins Screen (FIG. 26) provided he has made valid entries in all the fields, as described below.

Figure 19:
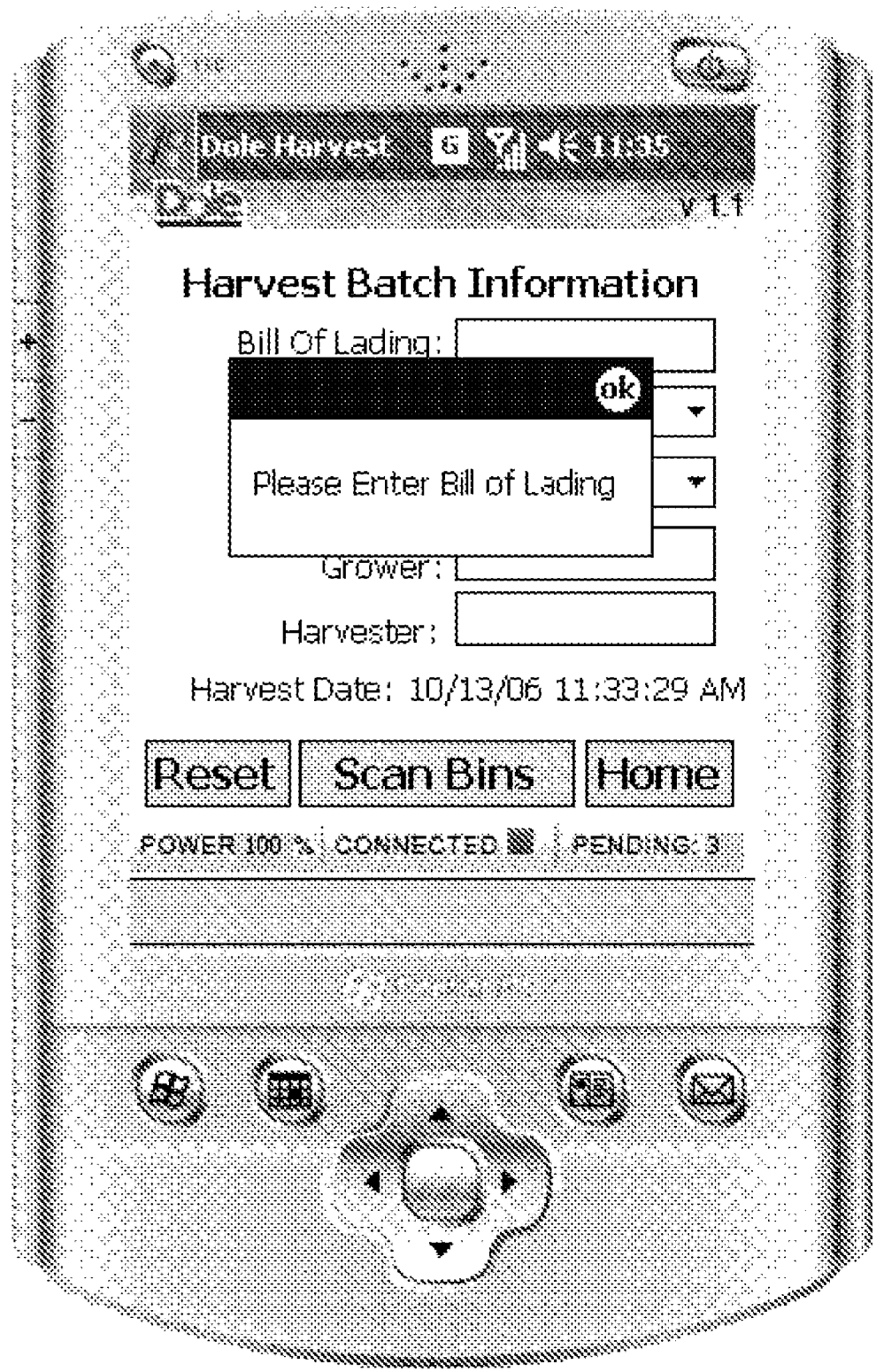

The Bill of Lading field 1800 takes BOL information associated with a batch and is limited to 9 characters. Any letters a-z and/or numbers will form a valid entry in to this field. Failing to enter this field would make the screen 1900 appear as shown in FIG. 19.

The Product field 1802 is used to select the product being harvested from the drop down. It should be recognized that the product may be entered rather than selected from the drop down.

Figure 20:

The GRL can be selected from the GRL field 1804 drop down or a manual entry selected will enable the user to key in GRL. Any characters up to a length of 9 are permissible. The screen with GRL keyed in would appear as shown in FIG. 20.

Figure 21:

The Grower field 1806 is used to key in the Grower of the agricultural product information. Any valid name, e.g. John Smith, Ron Donald, etc. will be a valid entry. Special characters, such as $, ô, & etc and numbers, are not allowed. Missing entry in this field on save/scan bins operation would make screen 2100 appear as shown in FIG. 21.

Figure 22:
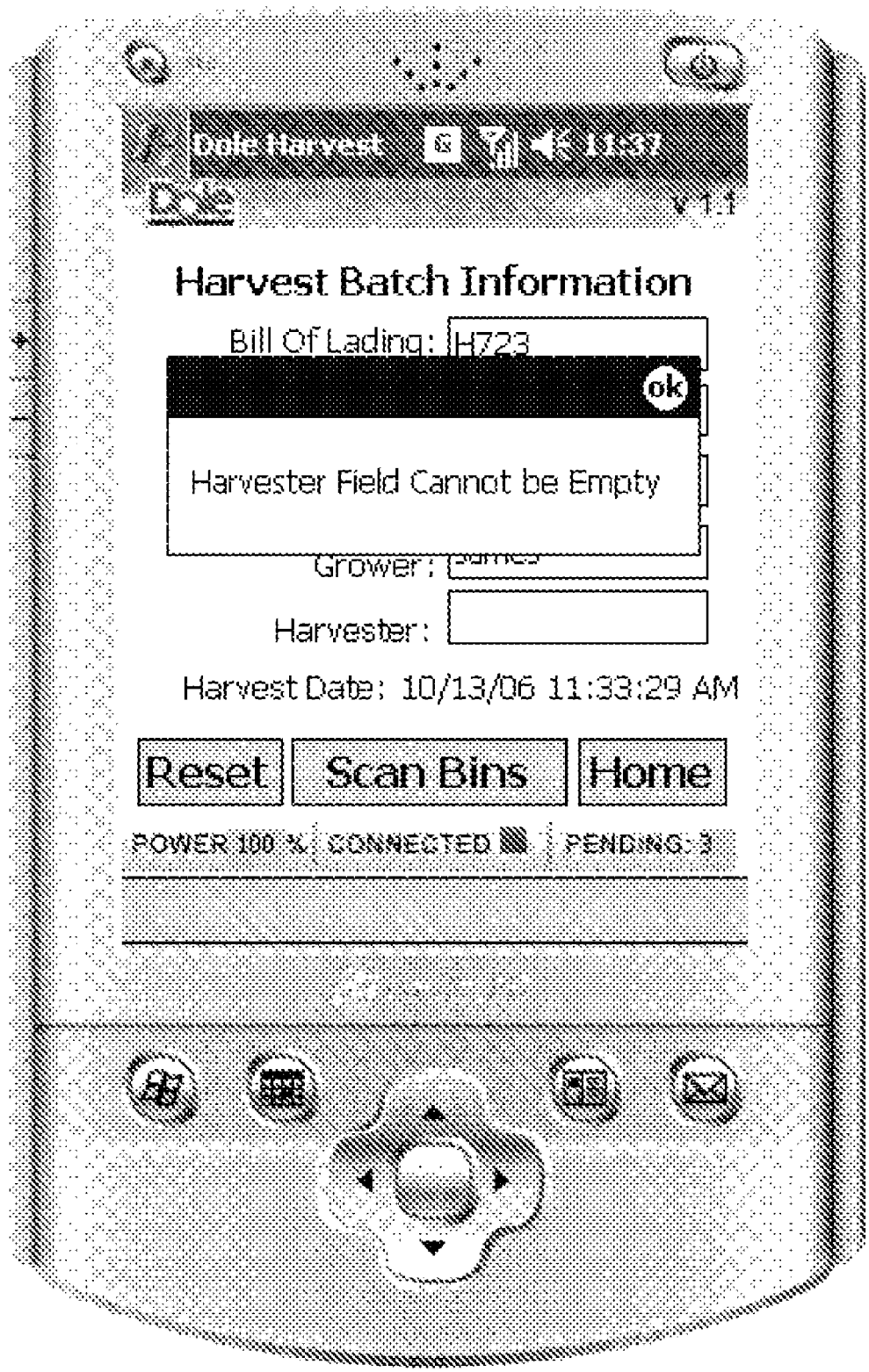

Harvester field 1808 is used to key in the Harvester of the agricultural product information. Any valid name e.g. John Smith, Ron Donald, etc. will be a valid entry. Special characters such as $, ô, & etc and numbers are not allowed. Missing entry in this field on save/scan bins operation would make screen 2200 appear as shown in FIG. 22.

Figure 23:

This Harvest Date field 1810 displays the current date and time to the user. Clicking on button 1812 clears the entry on the fields and defaults the Harvest Batch Screen to its default values, as shown in FIG. 23.

Figure 26:

Clicking on button 1814 navigates to the "Scan Bins" screen (FIG. 26). However all the fields should have an entry and validated before the user is taken to the next screen. Failure of an appropriate entry would prompt the user to make corrections by showing one of the above screens with appropriate message.

Figure 24:
Figure 25:

Clicking on button 1816 navigates to the Home page (Language Selection Screen of FIG. 14). The user will be prompted with the option of saving the changes made before navigating to the Home page. The user is prompted with Popup 2400 ("Do you want to save the changes?") as shown in FIG. 24. On clicking "Yes" (2402), the changes will be saved and the Home screen will be shown. An invalid entry in any of the fields described above can show any of the above screens prompting the user to key in valid data. On Click on "No" (2404), all recent changes are ignored and the Home page is shown. If the changes are saved with valid information, the Initial Screen will have the "Scan Bins" button 2500 enabled as shown in FIG. 25.

EXAMPLE

Scan Bins Screen

Figure 27:
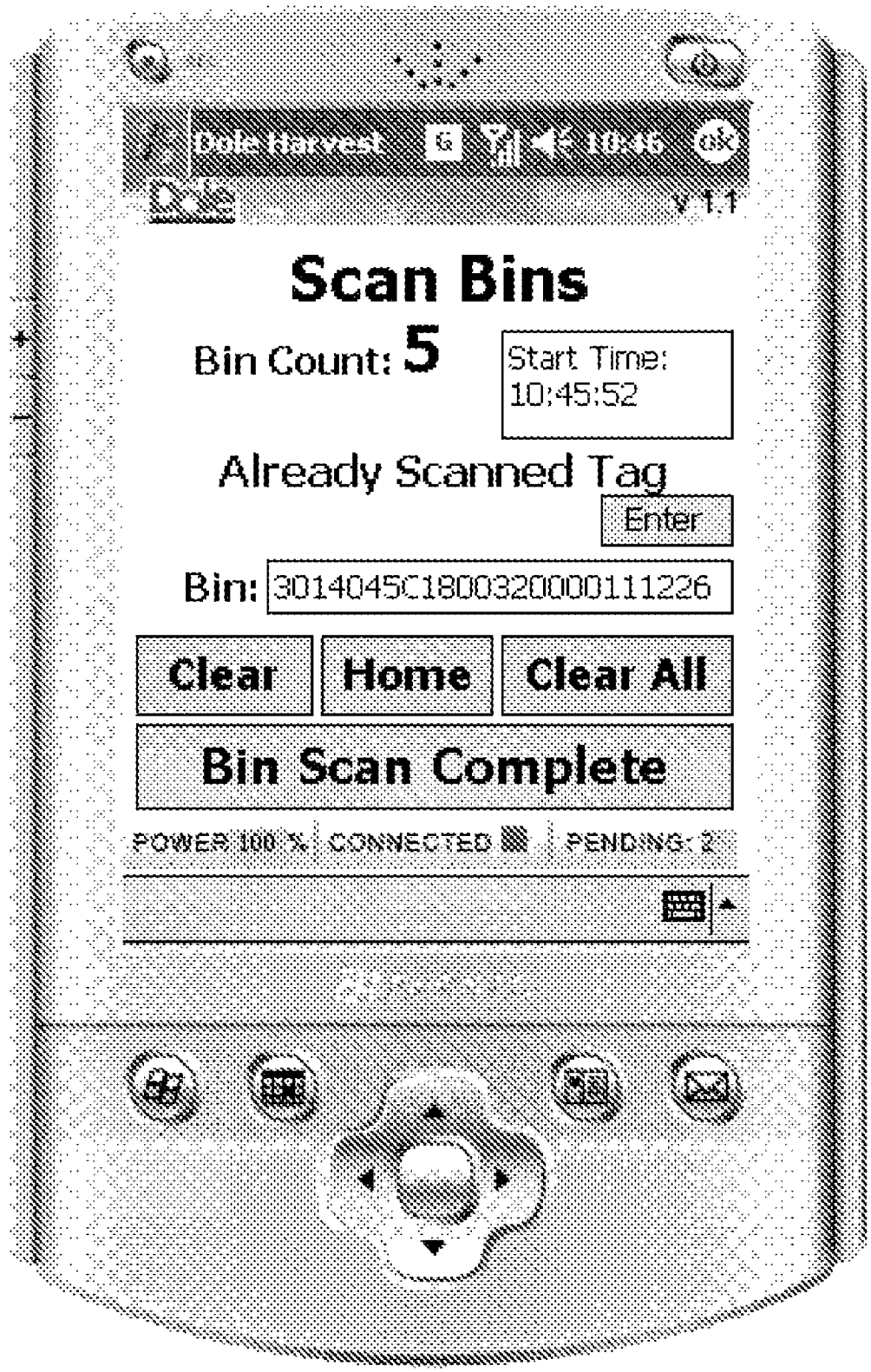
Figure 28:
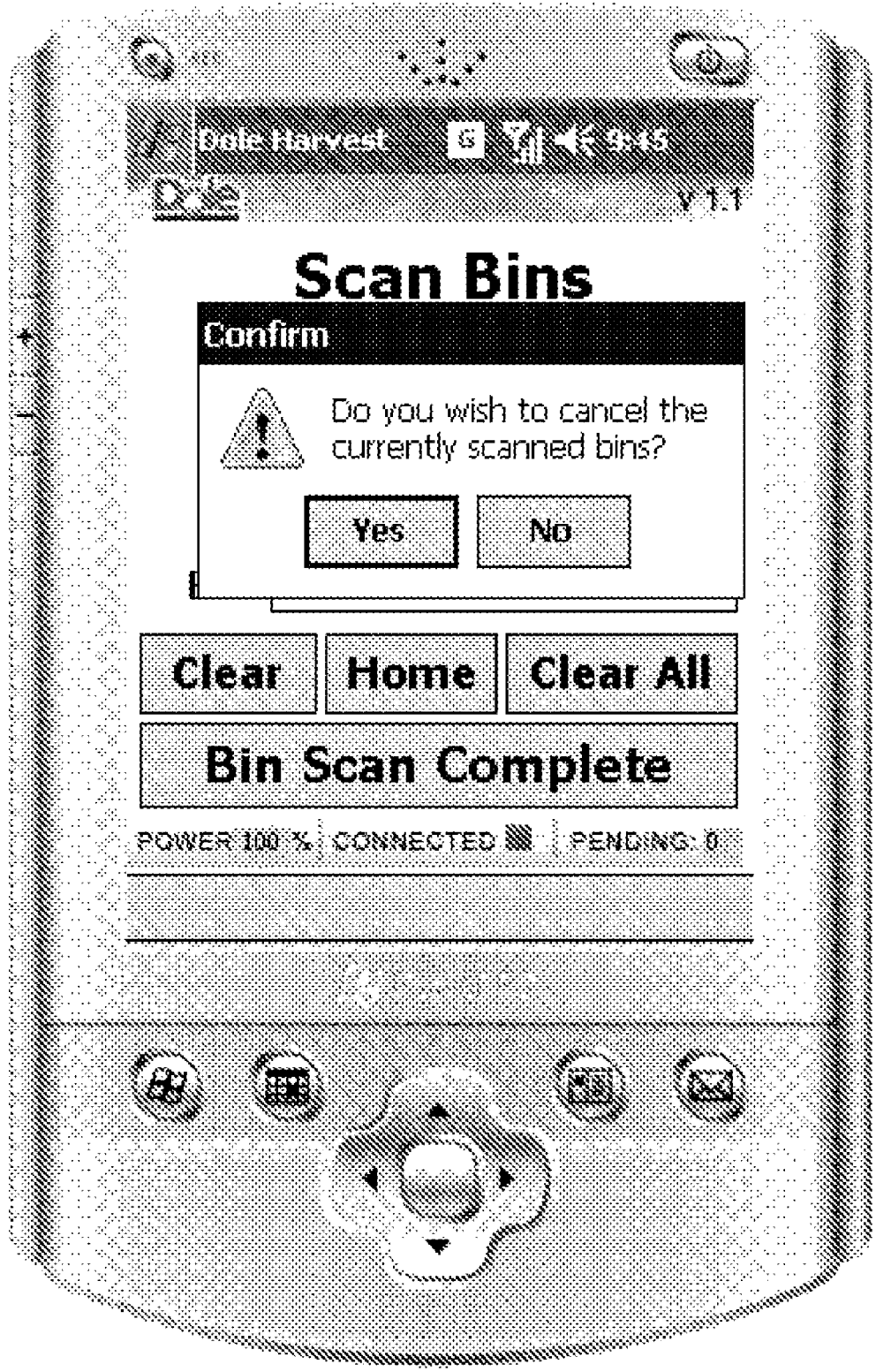
Figure 29:
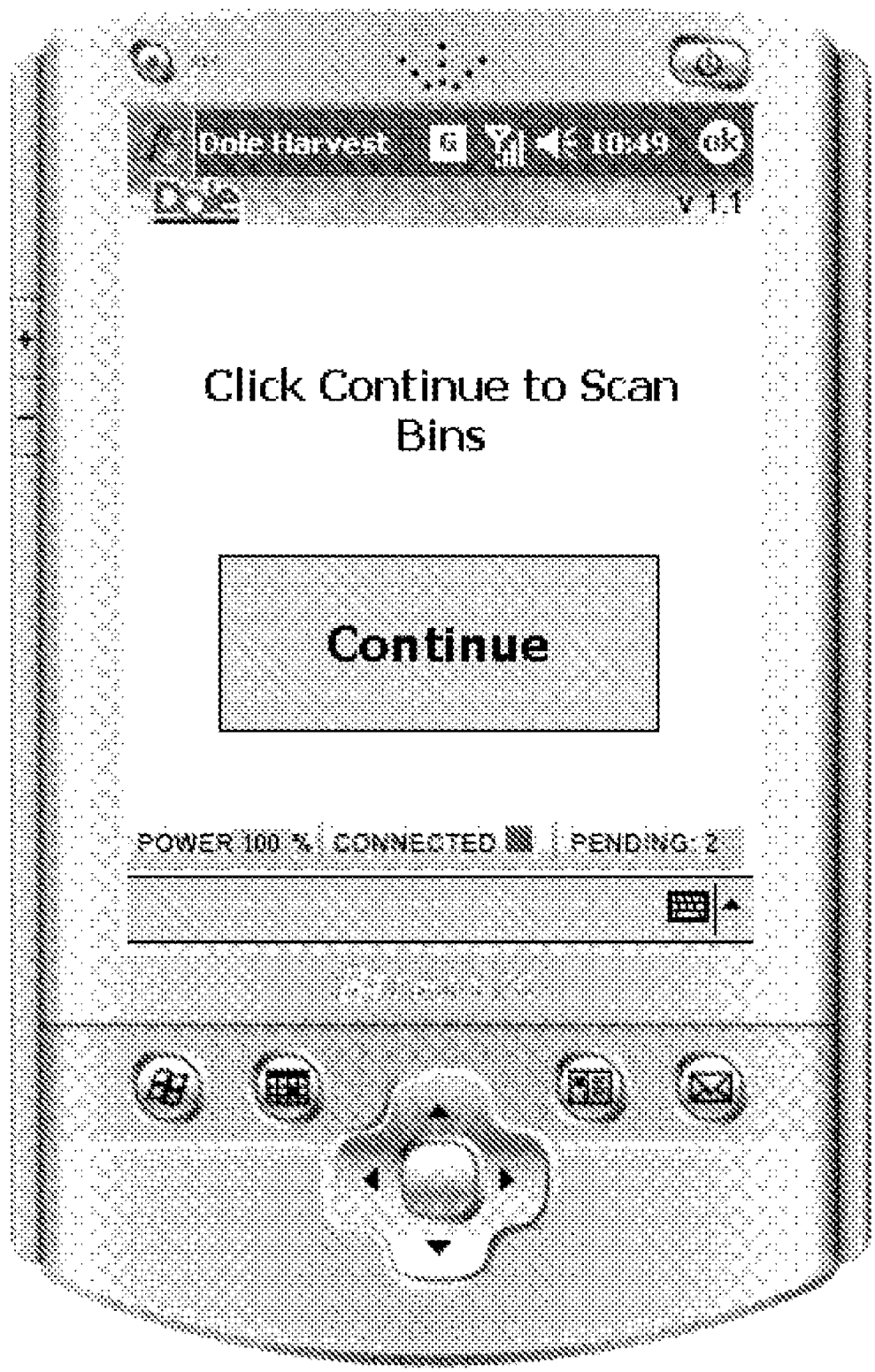
Figure 30:
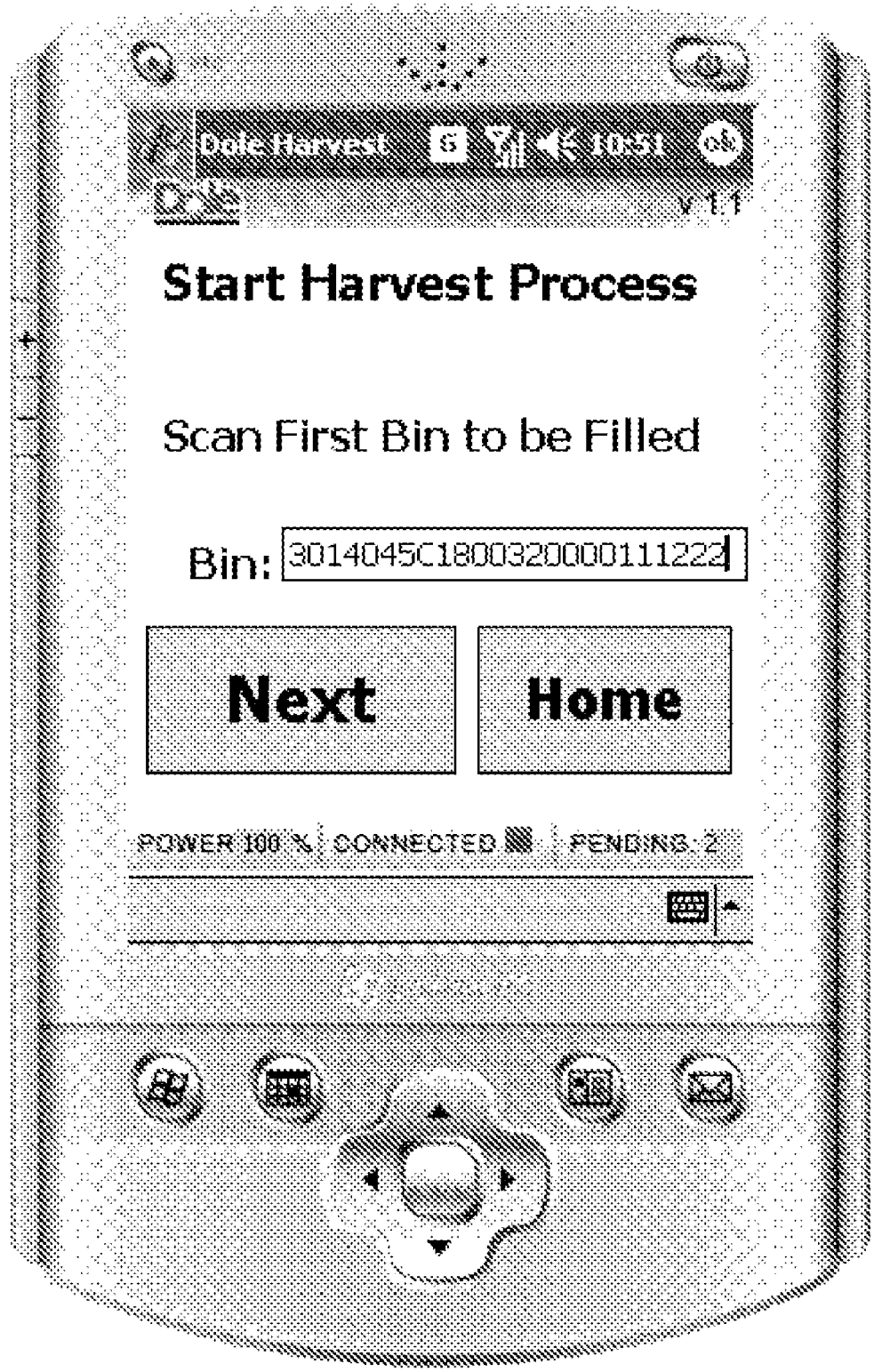
Figure 31:
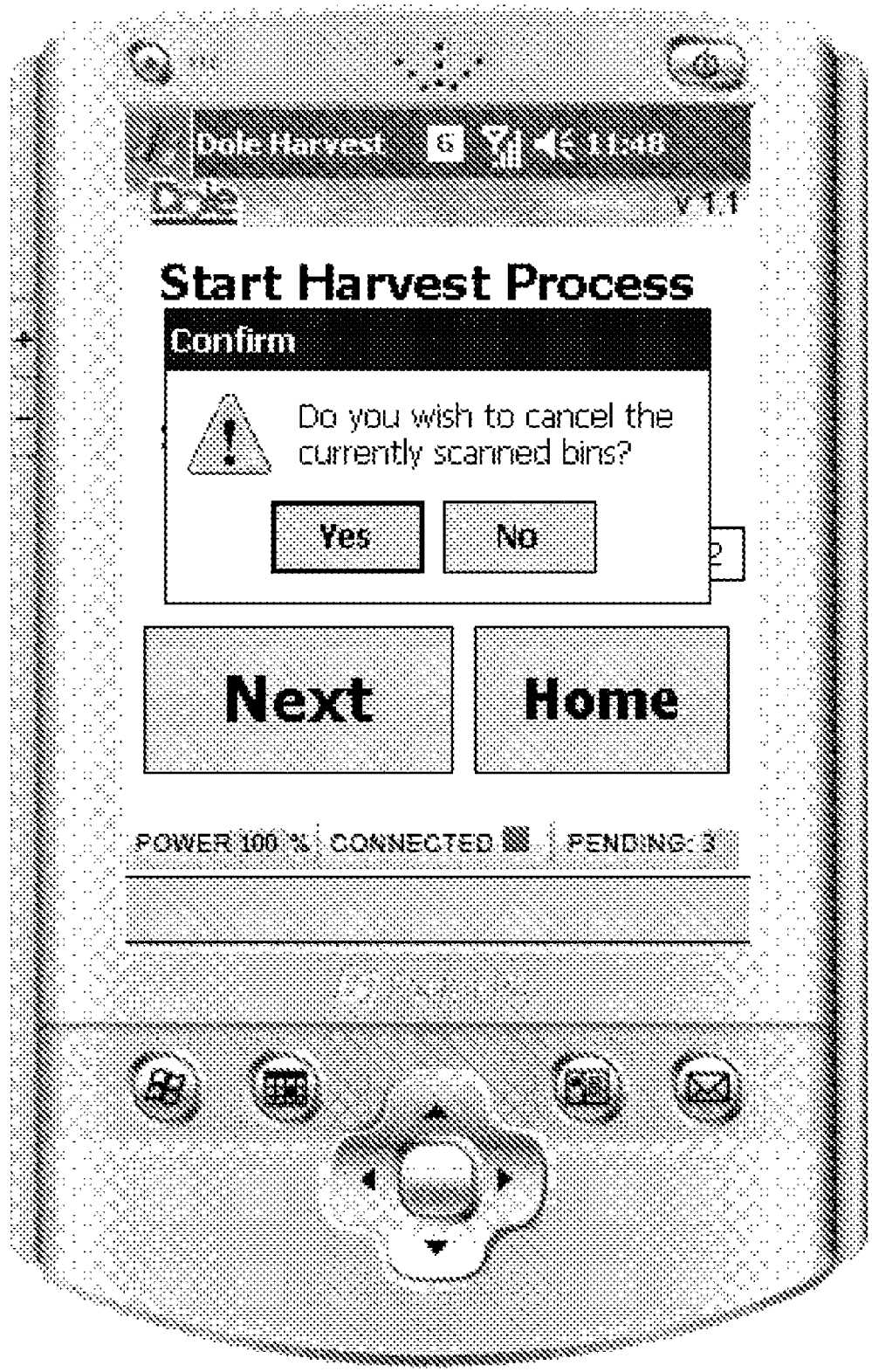

As described above, in one exemplary embodiment, such as in exemplary process 200, empty containers are scanned before they are filled with agricultural product. FIG. 26 depicts the Scan Bins Screen used to scan the empty containers before they are filled with agricultural product. The screen by default, prior to any scanning, will appear as shown. As the user scans the containers, the count goes up and the Bin Scan Complete button 2600 will be enabled. Bin Id field 2602 captures the container scanned by the device. The bin Id after being read is displayed as show in field 2602 of FIG. 27. As an alternative, the user can also enter the Bin Id on field 2602 in conjunction with Enter Button 2604, provided a valid Id is known. As the containers are scanned, the count 2606 is incremented by one, as shown in FIG. 27. Start Time 2608 is used to capture the time when the containers are prepared to be filled with agricultural product. In the present exemplary embodiment, at least one container needs to be scanned to reflect the time when the process started. FIG. 27 shows the time when the scanning process was started. Clear Button 2610 clears the last container that was read and displayed in the Bin Id field 2602. Home Button 2612 is used to navigate to the Home page. However the user is alerted with a message 2800 ("Do you wish to cancel the currently scanned bins?") as shown in FIG. 28. Clicking on "Yes" (2802) will take the user to the Home page. Clicking on "No" (2804) will let the user stay on the same page. Clear All Button 2614 is used to ignore all the containers that were read so far and start the scan process afresh. Clicking on Bin Scan Complete Button 2616 navigates to the "Start Harvest Screen" (FIG. 30). At least, one container has to be scanned by the user for button 2616 to be enabled. If the user waits on the Scan Bins Screen (FIG. 26) for over a preset time without any scanning activity, the wait screen appears as shown in FIG. 29. The user can click Continue button 2900 to resume scanning again.

EXAMPLE

Start Harvest Screen

Figure 32:
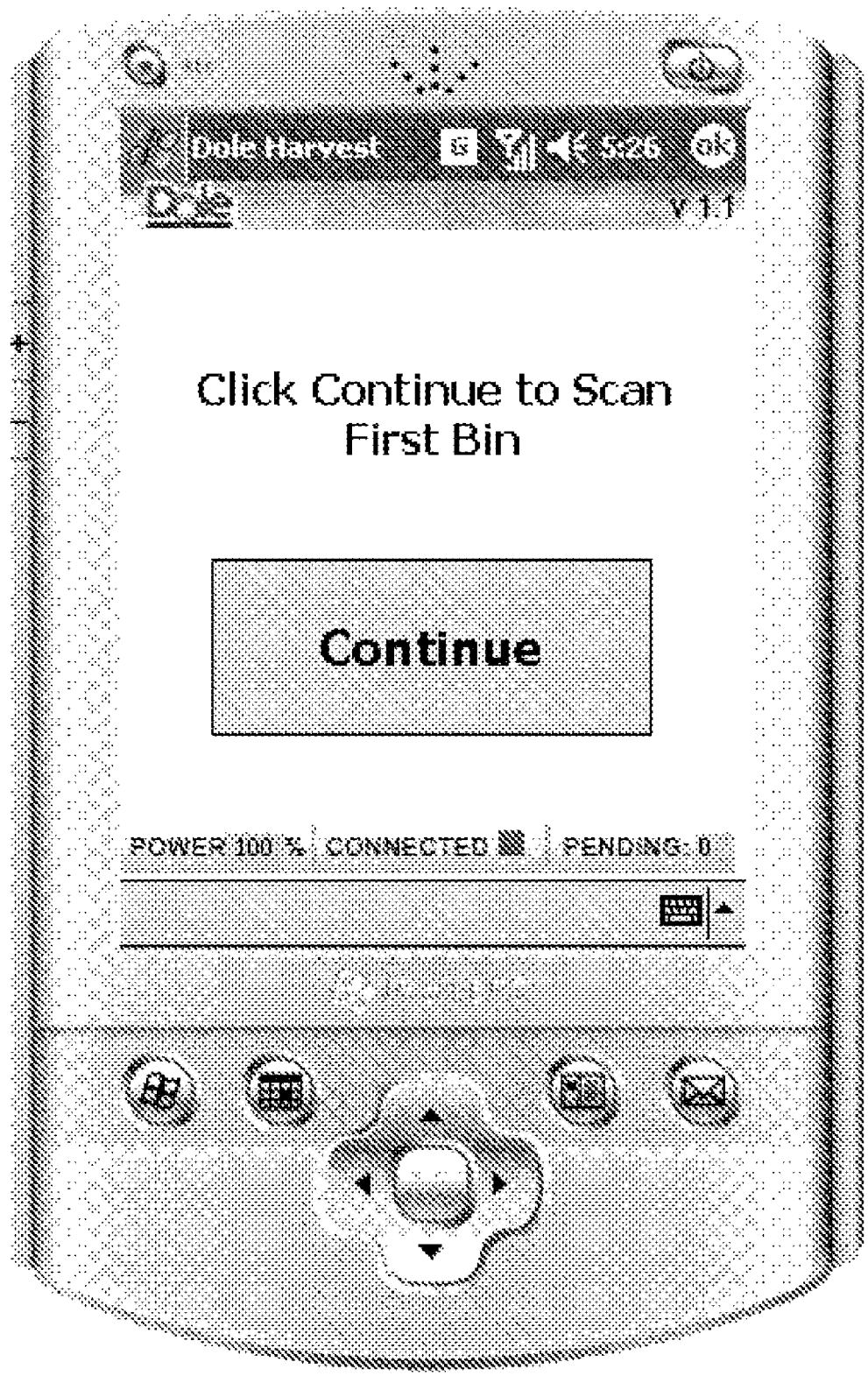
Figure 33:
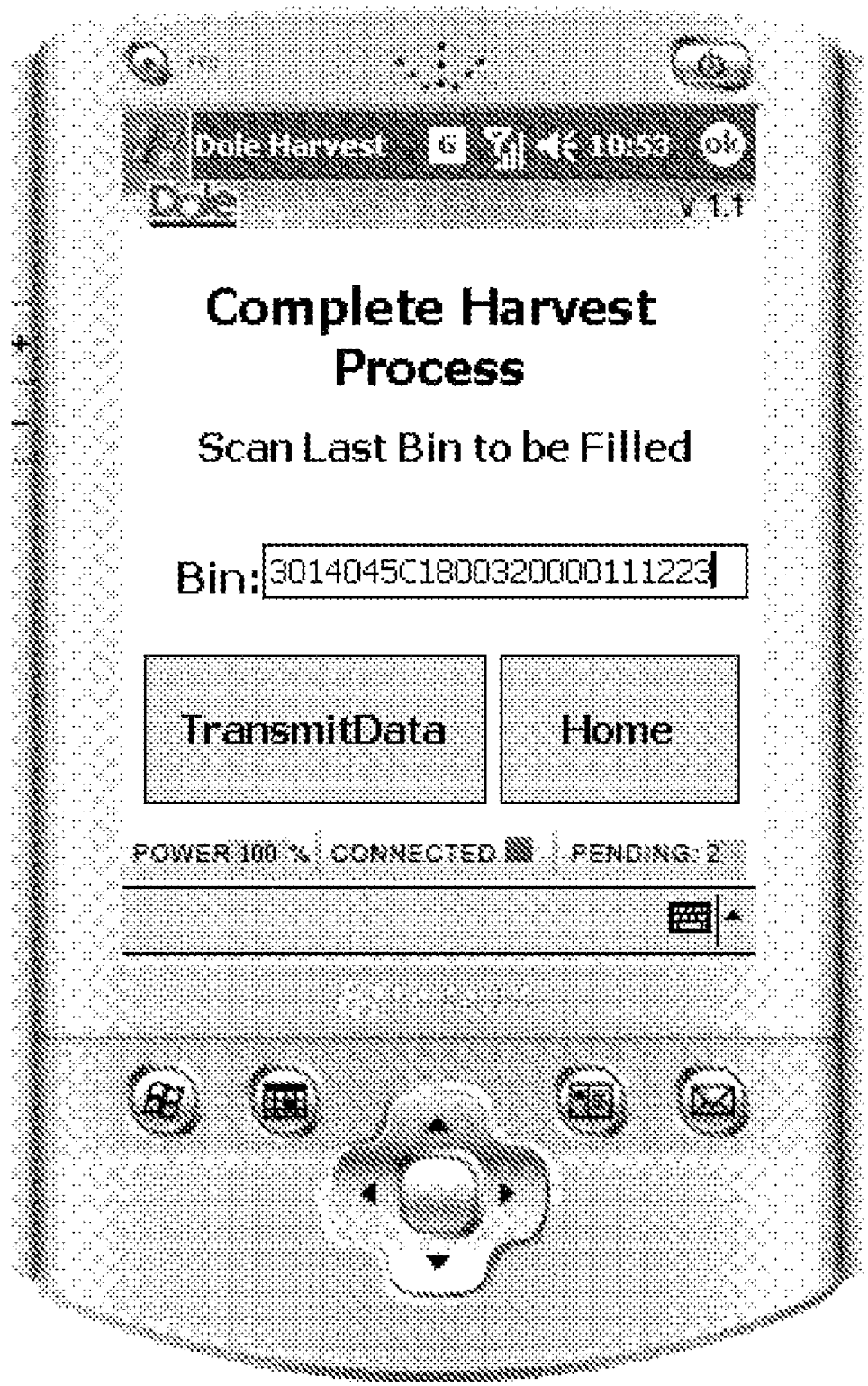

As described above, in one exemplary embodiment, such as in exemplary process 200, containers are scanned as they are filled with agricultural product. FIG. 30 depicts the Start Harvest Screen used at the time of filling the containers with the agricultural product. The user scans the first container of the load and the appropriate Id is captured in this screen at Bin field 3000. It has to be noted that the Id scanned here should be one of those that were scanned in the Scan Bins Screen (FIG. 26). At the start of scanning, Bin field 3000 captures the first container being scanned at the time of filling the containers of a particular batch with agricultural product. Next Button 3002 validates the container and takes the user to the Complete Harvest Screen (FIG. 33). If the container is found to be invalid or if the reader did not read the tags, appropriate feedback messages are shown in this screen for the user to make adjustments in the process. Home Button 3004 prompts the user with message 3100 ("Do you wish to cancel the currently scanned bins?") as seen on FIG. 31. Clicking on "Yes" (3102) would abort the scanning process and takes the user to the Home page. Clicking on "No" (3104) would let the user stay on the same page. An inactive operation on the Start Harvest Screen would force the user to be taken to a wait screen as shown in FIG. 32. The user has to click Continue Button 3200 to resume the scanning process.

EXAMPLE

Complete Harvest Screen

Figure 34:
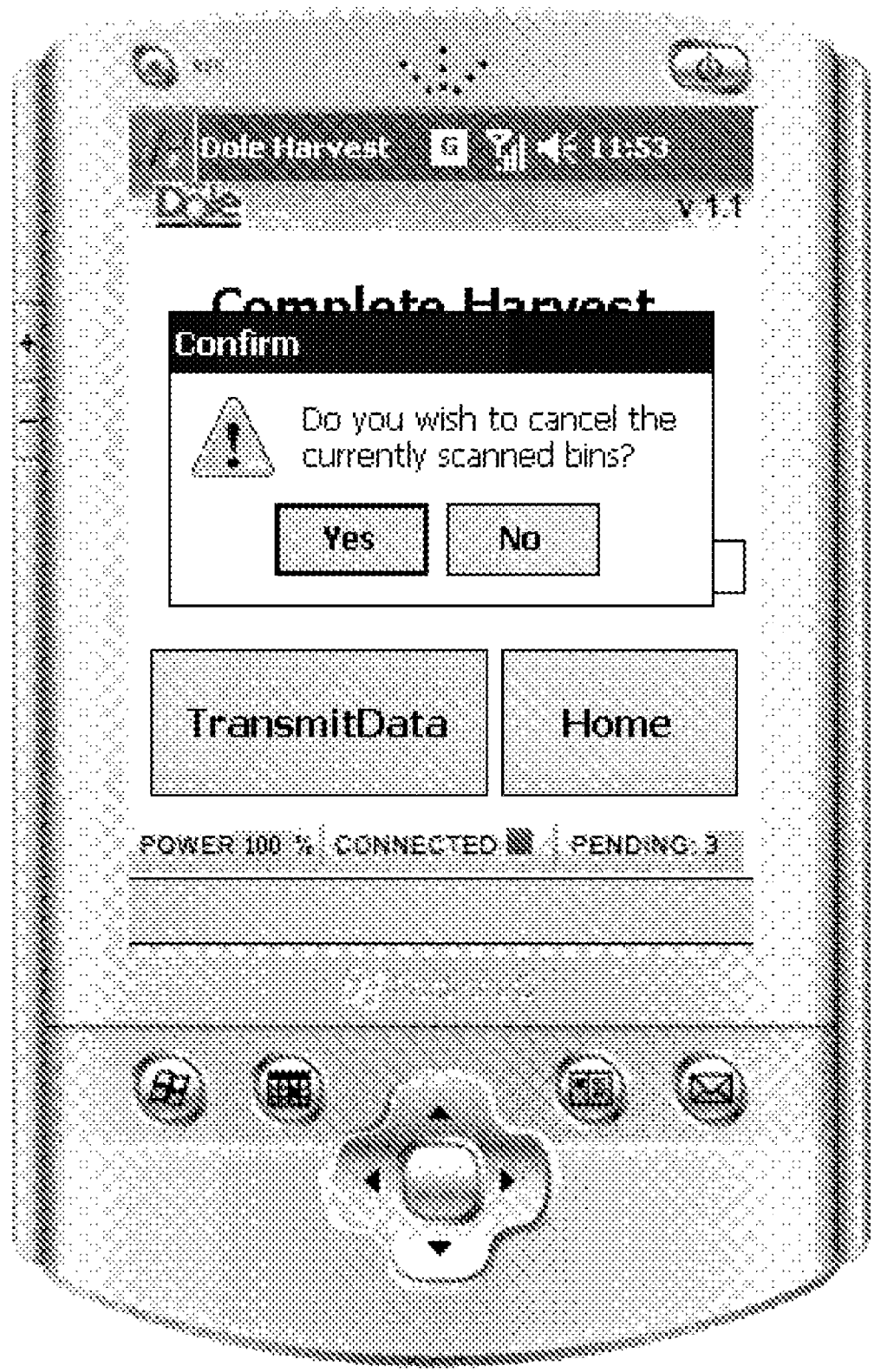
Figure 35:
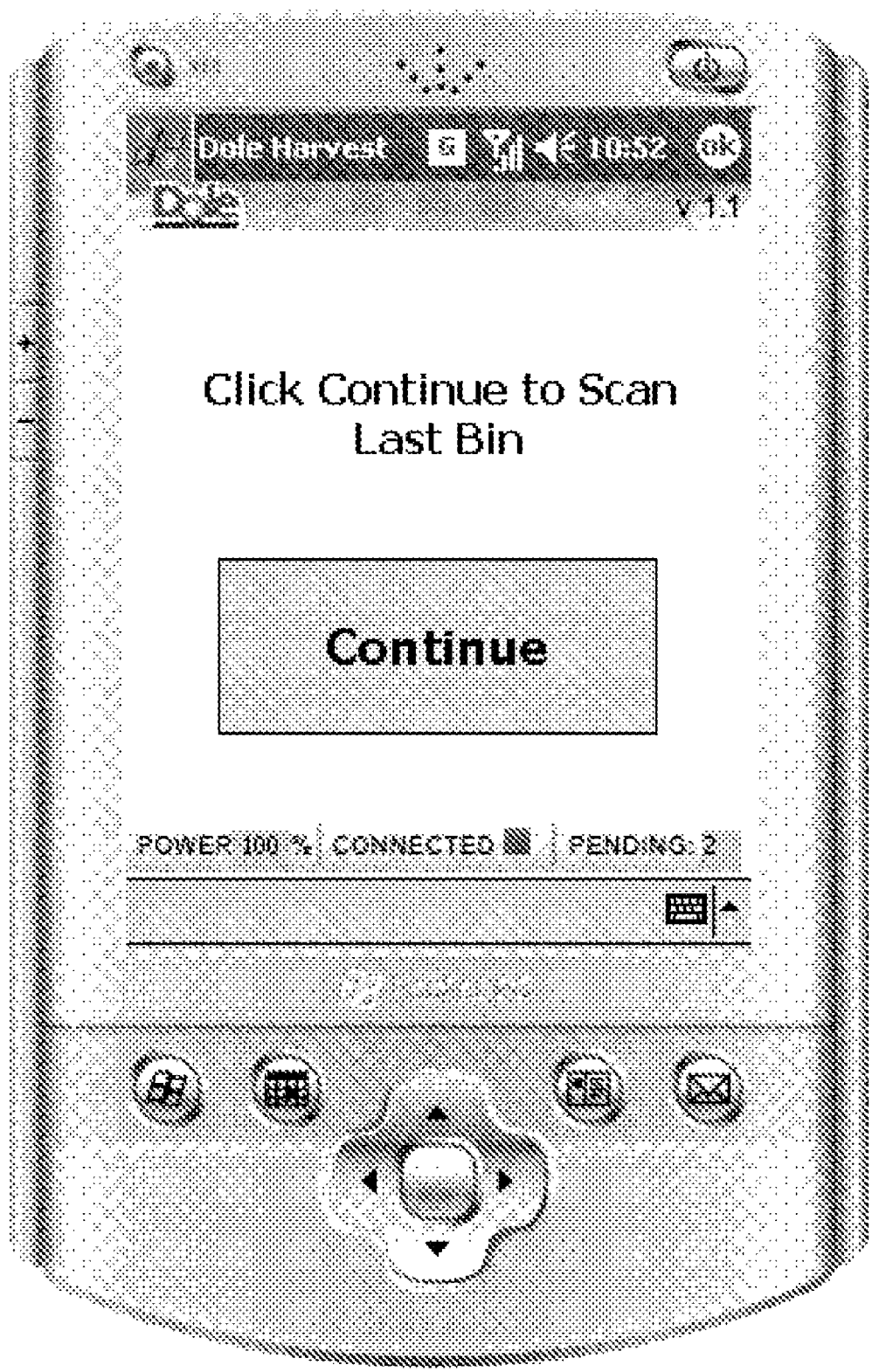

As described above, in one exemplary embodiment, such as in exemplary process 200, the last container is scanned when it is filled with agricultural product. FIG. 33 depicts the Complete Harvest Screen used to complete the harvest process by scanning the last container being filled with the agricultural product. Bin field 3300 captures the last container being scanned at the time of filling the containers of a particular batch with agricultural product. When the last container is scanned, an end time is captured. Clicking the TransmitData Button 3302 validates the container, saves the data locally and takes the user to the Home Page. If the container is found to be invalid or if the reader did not read the tags, appropriate feedback messages are shown in this screen for the user to make adjustments in the process. The data saved is sent to the server. Home Button 3304 prompts the user with message 3400 ("Do you wish to cancel the currently scanned bins?"), as shown in FIG. 34. Clicking on "Yes" (3402) would abort the scanning process and takes the user to the Home page. Clicking on "No" (3404) would let the user stay on the same page. An inactive operation on the Complete Harvest Screen would force the user to be taken to a wait screen as shown in FIG. 35. The user has to click Continue Button 3500 to resume the scanning process.

EXAMPLE

Status Labels

Figure 36:
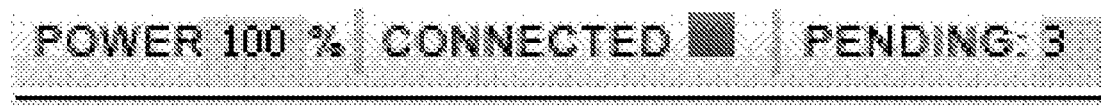

The application displays status of power, connectivity and pending files to be sent in all the above screens of the application via a Status Bar 3600, as shown in FIG. 36. Power Status Label 3602 displays the battery power available on the device. Connection Status Label 3604 displays connection status: a red icon (as shown) next to this label would indicate lack of connectivity and a green icon (not shown) would indicate the device is connected to the network. The Pending Status Label 3606 reflects the files saved to the device as a result of the harvest process and yet to be sent to the server.

EXAMPLE

Field Harvest Operation

The following example describes the steps of process 200 of FIG. 2 being performed using the Harvest System. As part of performing step 202, a harvest supervisor enters specific harvest information including BOL, GRL, product type, harvester, grower, and harvest crew data into the terminal. As part of performing step 204, the harvest application software then prompts the supervisor to scan the RFID tags associated with that harvested quantity, typically 24 RFID tags, one for each container to be filled with harvested product. The harvest application associates the data entered to each of the scanned tags, each tag acts as a unique license plate for each container. The tags are placed on the containers, which are subsequently placed on a transfer truck with a trailer. As part of performing step 206, the harvest application software then instructs the supervisor to scan the first container harvested. As the first containers begins to be filled; that container's RFID tag is scanned thus capturing the harvest start time. The harvest application software can automatically capture the GPS coordinate of the first container being filled and stores it for data transmission at a later time. After step 208 has been completed, as part of performing step 210, the harvest application software then prompts the supervisor to scan the last container harvested thus capturing the harvest stop time. FIG. 12 depicts the supervisor scanning the last container using the Harvest System. The harvest application software can automatically capture the GPS coordinate of the last container filled and stores it for data transmission at a later time. The harvest application software can then provide the user with the option to transmit data.

When the user presses the transmit data button all the data entered, scanned, acquired and stored is transmitted via cellular connection to a Tracking Manager server. Once transmitted the following can be accomplished for that BOL:

Transmits harvest data and container identification license numbers associated with BOL for downstream tracking reference;

Elapsed harvest time is captured;

GPS coordinates are stored; and

The departure time of the field haul truck is captured.

The data gathered and transmitted in the field serves as reference for all down stream tracking segments to use. The system provides a means to gather harvest information in the field and electronically transmit the information to a central repository. The system links RFID scanning technology with a manual input terminal and GPS capability. The system transmits data via cell phone. The system uses software to manage combined technologies and data.

Although exemplary embodiments have been described, various modifications can be made without departing from the spirit and/or scope of the present invention. Therefore, the present invention should not be construed as being limited to the specific forms shown in the drawings and described above but based on the claims below.

We claim:

1. A method for harvesting an agricultural product from a field to allow for later identification of a specific section of field where the harvesting occurred, the method comprising:

inputting harvest source information;

capturing, using a mobile computing device, a first Global Positioning System (GPS) coordinate corresponding to a first location in the field;

harvesting the agricultural product from the first location that is the starting point of the harvesting to a second location in the field that is the ending point of the harvesting;

storing the agricultural product harvested from the first location to the second location in a set of containers;

capturing a second GPS coordinate corresponding to the second location;

associating a unique Radio Frequency Identification (RFID) value to each container of the set of containers to create a set of RFID values;

associating the source information, the first GPS coordinate, and the second GPS coordinate to the set of RFID values; and determining the specific section of field from which the agricultural product was harvested based on the first GPS coordinate and the second GPS coordinate.

2. The method of claim 1, further comprising:

transmitting the source information, the first GPS coordinate, the second GPS coordinate, and the set of RFID values.

3. The method of claim 2, wherein associating the source information, the first GPS coordinate, and the second GPS coordinate to the set of RFID values is performed before transmitting the source information, the first GPS coordinate, the second GPS coordinate, and the set of RFID values.

4. The method of claim 2, wherein associating the source information, the first GPS coordinate, and the second GPS coordinate to the set of RFID values is performed after transmitting the source information, the first GPS coordinate, the second GPS coordinate, and the set of RFID values.

5. The method of claim 2, further comprising:

transporting the agricultural product in the set of containers to one or more processing plants;

processing the agricultural product at the one or more processing plants;

packaging the agricultural product into a set of packages, associating a unique identification with each package in the set of packages to create a set of unique identifications;

tracking the movement of the agricultural product through the processing and packaging step using the set of RFID values; and associating the unique identifications with the set of RFID values, wherein the agricultural product packaged in any one package in the set of packages is traceable to the specific location in the field from where the agricultural product was harvested using the association between the unique identifications to the set of RFID values.

6. The method of claim 1, wherein:
   capturing the first GPS coordinate further includes recording a first time stamp corresponding to the time of capture of the first GPS coordinate;
   capturing the second GPS coordinate further includes recording a second time stamp corresponding to the time of capture of the second GPS coordinate; and
   the set of associated RFID values is further associated with the first time stamp and the second time stamp.

7. The method of claim 6, wherein the first GPS coordinate and the second GPS coordinate are different GPS coordinates and the first time stamp is different than the second time stamp.

8. The method of claim 1, wherein the source information entered is selected from the group consisting of: grower information, grower ranch lot information, product type, harvesting entity information, bill of lading (BOL) information, and harvest crew information.

9. The method of claim 1, wherein the source information is inputted into a harvest device, the harvest device comprising:
   a hand held data collection terminal;
   a RFID reader; and
   a GPS module.

10. The method of claim 9, wherein the GPS module of the harvest device provides the first GPS coordinate and the second GPS coordinate.

11. The method of claim 1, wherein the step of associating a unique RFID value to each container of the set of containers to create a set of RFID values occurs before the harvesting.

12. A computer-readable storage medium that stores a computer program for associating agricultural product harvest information with GPS coordinates to allow for later identification of a specific section of field where a harvest occurred and the time at which harvest occurred, the computer program comprising instructions for:
   receiving harvest source information;
   receiving a first GPS coordinate corresponding to a first location in the field that is indicative of the starting point of the harvest;
   receiving a second GPS coordinate corresponding to a second location in the field that is indicative of the ending point of the harvest, wherein the agricultural product was harvested from the first location to the second location in the field;
   receiving a set of RFID values, wherein each RFID value of the set of RFID values is unique, and wherein each RFID value is associated with a container of a set of containers that stores the agricultural product harvested from the first location to the second location in the specific section of field; and
   associating the source information, the first GPS coordinate, and the second GPS coordinate to the set of RFID values; and
   determining the specific section of field from which the agricultural product was harvested based on the first GPS coordinate and the second GPS coordinate.

13. The computer-readable storage medium of claim 12, further comprising instructions for:
   transmitting the source information, the first GPS coordinate, the second GPS coordinate, and the set of RFID values.

14. The computer-readable storage medium of claim 12, further comprising instructions for:
   receiving a first time stamp corresponding to the first GPS coordinate;
   receiving a second time stamp corresponding to the second GPS coordinate; and
   storing the first time stamp and second time stamp with the source information, the first GPS coordinate, the second GPS coordinate, and the set of RFID values.

15. The computer-readable storage medium of claim 12, wherein the source information is selected from the group consisting of: grower information, grower ranch lot information, product type, harvesting entity information, bill of lading (BOL) information, and harvest crew information.

16. The computer-readable storage medium of claim 12, wherein the instructions for receiving the second GPS coordinate comprises instructions for:
   receiving the second GPS coordinate only after receiving the first GPS coordinate.

17. The computer-readable storage medium of claim 12, wherein the instructions for receiving the second GPS coordinate comprises instructions for:
   receiving the second GPS coordinate only if the second GPS coordinate is different than the first GPS coordinate.

18. A system for use in harvesting an agricultural product from a field and to allow for later identification of a specific section of field where the harvesting occurred, the system comprising:
   a hand held data collection terminal configured to accept harvest source information;
   a Radio Frequency Identification (RFID) reader configured to read one or more RFID tags to initiate and conclude a harvesting process to harvest the specific section of field;
   a Global Positioning System (GPS) module configured to capture a first GPS coordinate corresponding to a first location in the field that is indicative of the starting point of the harvesting and a second GPS coordinate corresponding to a second location in the field that is indicative of the ending point of the harvesting, wherein the first and the second GPS coordinates indicate the specific section of field from which the agricultural product was harvested;
   a cellular communications adaptor configured to transmit the source information, the first GPS coordinate, the second GPS coordinate, wherein the source information, the first GPS coordinate, and the second GPS coordinate are associated with a set of RFID values, wherein each RFID value of the set is associated with a container in a set of containers that store the agricultural product harvested from the specific section of field, and wherein the hand held data collection terminal, the RFID reader, the GPS module, and the cellular communications adaptor are integrated into a handheld unit.

19. The method of claim 1, further comprising:
   associating information related to an order of filling each container of the set of containers to the set of RFID values.

* * * * *